US009076267B2

(12) United States Patent
Shimizu

(10) Patent No.: US 9,076,267 B2
(45) Date of Patent: Jul. 7, 2015

(54) IMAGE CODING DEVICE, INTEGRATED CIRCUIT THEREOF, AND IMAGE CODING METHOD

(75) Inventor: Kenji Shimizu, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 445 days.

(21) Appl. No.: 13/695,882

(22) PCT Filed: Apr. 6, 2012

(86) PCT No.: PCT/JP2012/002448
§ 371 (c)(1), (2), (4) Date: Nov. 2, 2012

(87) PCT Pub. No.: WO2013/011608
PCT Pub. Date: Jan. 24, 2013

(65) Prior Publication Data

US 2013/0147843 A1 Jun. 13, 2013

(30) Foreign Application Priority Data

Jul. 19, 2011 (JP) ................................ 2011-158060

(51) Int. Cl.
*G09G 5/00* (2006.01)
*G06T 11/60* (2006.01)
(Continued)

(52) U.S. Cl.
CPC ............ *G06T 11/60* (2013.01); *H04N 13/0018* (2013.01); *H04N 13/0048* (2013.01); *H04N 2013/0081* (2013.01); *H04N 19/597* (2014.11); *H04N 19/119* (2014.11); *H04N 19/134* (2014.11); *H04N 19/117* (2014.11); *H04N 19/174* (2014.11); *H04N 19/85* (2014.11)

(58) Field of Classification Search
None
See application file for complete search history.

(56) References Cited

U.S. PATENT DOCUMENTS 8,405,708 B2 * 3/2013 Robinson et al. ............... 348/42
2012/0014570 A1 * 1/2012 Abe ............................. 382/124

FOREIGN PATENT DOCUMENTS

EP 2 348 734 A1 7/2011
JP 5-268484 10/1993
(Continued)

OTHER PUBLICATIONS

International Search Report issued Jun. 26, 2012 in corresponding International Application No. PCT/JP2012/002448.
(Continued)

*Primary Examiner* — Kee M Tung
*Assistant Examiner* — Frank Chen
(74) *Attorney, Agent, or Firm* — Wenderoth, Lind & Ponack, L.L.P.

(57) ABSTRACT

To aim to achieve addition of blur to an image based on distance information of a subject and to appropriate determination of a block size that is a unit for coding. Blur is added to the image with use of one of disparity information for each pixel unit and distance information for each pixel unit and arbitrary blur conditions. A block size of each region of the image that are to be divided into blocks for coding is determined based on a blur value of the region. The image is divided into blocks based on the determined block sizes and coded in units of blocks. By increasing a block size with respect to a region included in an image having a high blur value, it is possible to reduce processing amount of reference block searching, thereby achieving speed-up of processing and reduction in processing amount.

13 Claims, 20 Drawing Sheets

(51) Int. Cl.

| | |
|---|---|
| ***H04N 13/00*** | (2006.01) |
| ***H04N 19/597*** | (2014.01) |
| ***H04N 19/119*** | (2014.01) |
| ***H04N 19/134*** | (2014.01) |
| ***H04N 19/117*** | (2014.01) |
| ***H04N 19/174*** | (2014.01) |
| ***H04N 19/85*** | (2014.01) |

(56) References Cited

FOREIGN PATENT DOCUMENTS

| | | |
|---|---|---|
| JP | 9-284775 | 10/1997 |
| JP | 2004-239791 | 8/2004 |
| JP | 2005-295215 | 10/2005 |
| JP | 2007-67469 | 3/2007 |
| JP | 2007-289556 | 11/2007 |
| JP | 2010-206362 | 9/2010 |
| WO | 2010/052833 | 5/2010 |

OTHER PUBLICATIONS

Katsuaki Murayama, "3D Production Compiling Technology and 3D distortion", Chapter 3:3.2, CMC Publishing Co., Ltd., Jul. 31, 2008, pp. 61-62 (with partial English translation).

* cited by examiner

FIG. 3A Filter coefficient (1)
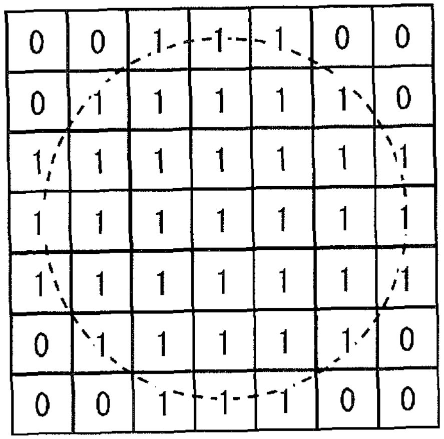
FIG. 3B Filter coefficient (2)
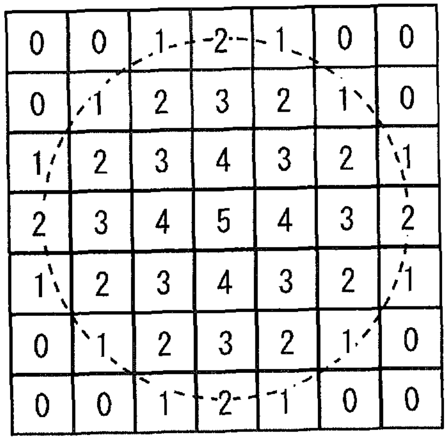

IMAGE CODING DEVICE, INTEGRATED CIRCUIT THEREOF, AND IMAGE CODING METHOD

TECHNICAL FIELD

The present invention relates to an image coding art of adding blur to an image and coding the image to which blur has been added.

BACKGROUND ART

As a process for exhibiting a stereoscopic effect by accentuating a main subject among subjects included in an image, there is performed processing of focusing the main subject and intentionally blurring the foreground and the background of the focused main subject. Also, stereoscopic video signals for realizing stereoscopic display might cause a problem that when a viewer attends to a distant view in the image, the viewer has a strong feeling of fatigue or cannot stereoscopically view the image (see Non-Patent Literature 1, for example). In order to prevent this problem, there is performed processing for blurring the distant view represented by stereoscopic video signals so as not cause the viewer attend to the distant view.

Also, in order to reduce the collective redundancy to improve the compression coding efficiency, there is performed image coding processing by collecting a number of pixels to form blocks. Accordingly, prediction coding is performed to improve the compression rate with use of the correlation between the blocks. Specifically, while inter prediction or intra prediction is performed on complicated images in units of small blocks, inter prediction or intra prediction is performed on smooth images in units of large blocks. This enables performance of efficient prediction on both complicated images and smooth images.

Patent Literature 1 discloses an ultrasonic diagnostic device, as a conventional example of a coding device for changing the block size based on characteristics of each of coding target regions of an image. Generally, according to such an ultrasonic diagnostic device, as a subject is closer to a focus point, an image resolution is higher, and as the subject is more distant from the focus point, the image resolution is lower. Accordingly, the ultrasonic diagnostic device determines the block size with use of distance information and focus point information, thereby achieving both high image quality of a region having a high resolution and high compression of a region having a low resolution.

Also, Patent Literature 2 discloses another conventional example of a coding device. Focusing an attention on that flicker tends to occur in a static region having a high flatness degree, the art of Patent Literature 2 increases the block size of such a static region having a high flatness degree so as to generate a compressed image with suppressed flicker.

CITATION LIST

Patent Literature

[Patent Literature 1] Japanese Patent Application Publication No. 2007-289556

[Patent Literature 2] Japanese Patent Application Publication No. 2007-67469

Non-Patent Literature

[Non-Patent Literature 1] Toshio HONDA Eds., "3-D Display Technologies-New Trends of Space Expression-", CMC Publishing Co., Ltd. Jul. 31, 2008, pp. 61-62

SUMMARY OF INVENTION

Technical Problem

According to the art of Patent Literature 1, the block size for coding is determined based on distance information and focus point information. However, the block size, which is determined based on only the distance information and the focus point information, is not necessarily appropriate for an image on which any type of blur processing among various types of blur processing has been performed.

Also, according to the art of Patent Literature 2, the block size is determined based on the smooth degree of each of coding target regions of an image. However, the block size, which is determined based on only the judgment as to whether the coding target region is smooth, is not necessarily appropriate for the image on which blur processing has been performed.

The present invention was made in view of the above problems, and aims to provide an image coding device and an image coding method for selecting an appropriate block size for coding an image on which any type of blur processing among various types of blur processing has been performed based on disparity information or distance information.

Solution to Problem

In order to solve the above conventional problems, the image coding device relating to the present invention comprises: an image acquisition unit configured to acquire one or more images; a disparity acquisition unit configured to acquire, with respect to each of the acquired images, one of disparity information for each pixel unit and distance information for each pixel unit; a blur value determination unit configured to determine a blur value of the image for each pixel unit based on the acquired one of the disparity information and the distance information; a blur processing unit configured to perform blur processing on the image with use of the determined blur value; a block size determination unit configured to determine, with respect to the image on which the blur processing has been performed, a block size of each of regions of the image that are to be divided into blocks for coding, from among a plurality of block sizes based on a blur value of the region; and a coding unit configured to code the image in units of blocks in accordance with the determined block sizes.

Advantageous Effects of Invention

With this structure, the block size is determined based on the blur value for coding each image. This enables use of a block size appropriate for an image on which blur processing has been performed, based on the blur value.

BRIEF DESCRIPTION OF DRAWINGS

FIG. 3A and FIG. 3D each show an example of a blur matrix relating to Embodiment 1 of the present invention.

DESCRIPTION OF EMBODIMENTS

Figure 1:
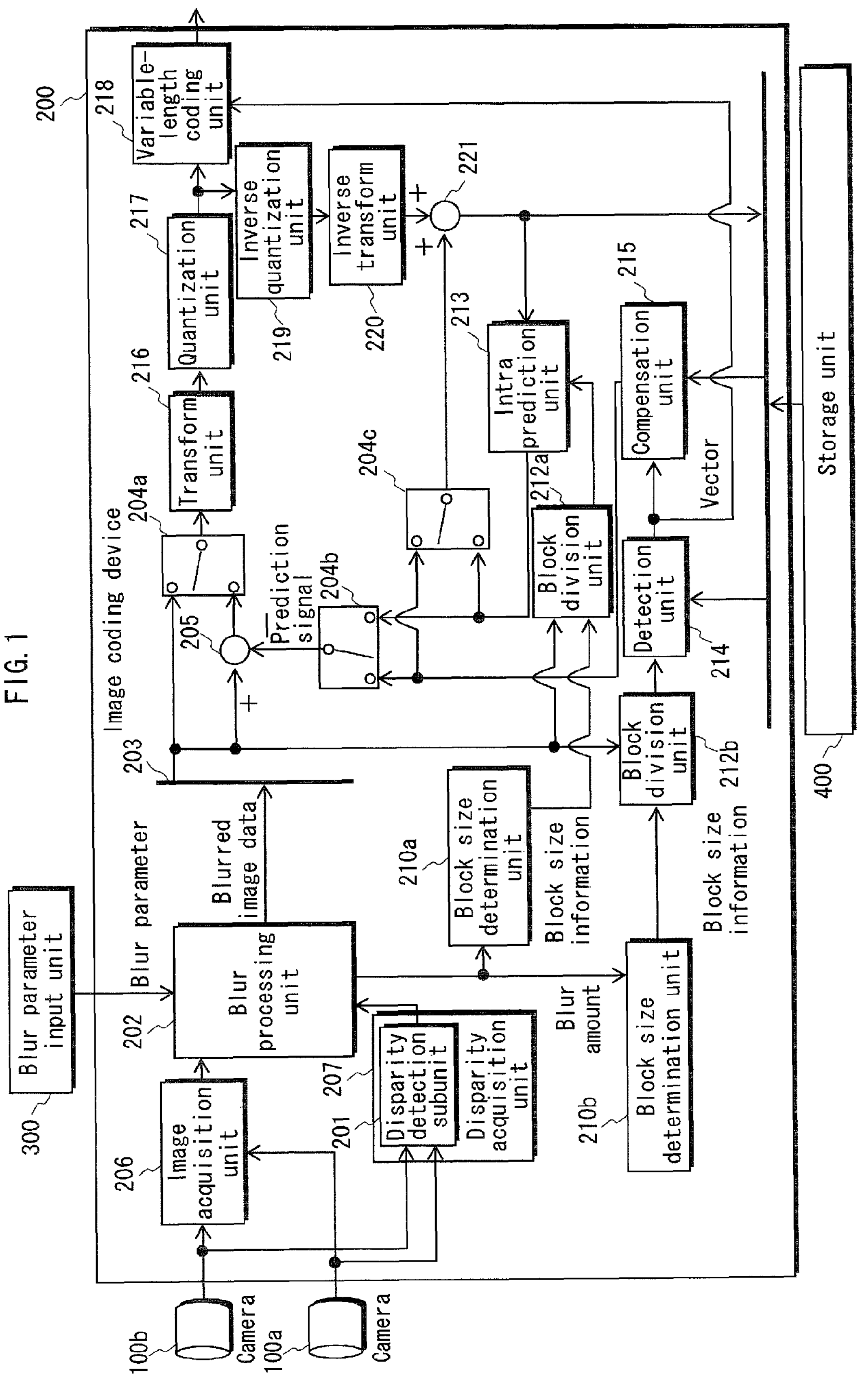
FIG. 1 is a block diagram showing an image coding device relating to Embodiment 1 of the present invention.

<Process by which the Present Invention has been Achieved>

As one of image processing, blur processing based on a distance between a camera and a subject is an important art. As a process for exhibiting a stereoscopic effect by accentuating a main subject among subjects included in an image, there is performed processing of focusing the main subject and intentionally blurring the foreground and the background of the focused main subject, for example. According to such blur processing, there is a case where the foreground and the background of the main subject are blurred by reproducing "bokeh" that is expected to occur due to photographing by an optical system with a shallow depth of field. In addition to the above case, the blur processing includes various types of processing. For example, the blur degree is changed between the foreground and the background of a main subject. Also for example, a plurality of persons each having a different distance are focused, and the foreground of a person positioned most forward and the background of a person positioned most backward are blurred. Moreover for example, both a person and a building behind the person are focused so as to be accentuated, and subjects other than the person and the building are blurred.

Also, as described in Non-Patent Literature 1, stereoscopic video signals for realizing stereoscopic display might cause a problem that when a viewer attends to a distant view in the image and a distance indicated by disparity information and a focal distance become inconsistent with each other, the viewer has a strong feeling of fatigue or cannot stereoscopically view the image. Especially in the case where stereoscopic video signals generated on the assumption to be projected onto a small screen are enlargedly projected onto a large screen, the interval between a left-eye and a right eye on the assumption of the stereoscopic video signals accordingly increases. As a result, in the case where a distance between a subject image included in a left-view image and the subject image included in a right-view image exceeds the interval between the left-eye and the right eye (namely, backward divergence occurs), disparity of the subject cannot be true as the disparity for a single object, and this makes the viewer impossible to stereoscopically view the image. In order to prevent this problem, there is performed processing for blurring the distant view represented by stereoscopic video signals so as not cause the viewer attend to the distant view.

Also, in order to reduce the collective redundancy to improve the compression coding efficiency, there is performed image coding processing by collecting a number of pixels to form blocks. Accordingly, prediction coding is performed to improve the compression rate with use of the correlation between the blocks. Specifically, while inter prediction or intra prediction is performed on complicated images in units of small blocks, inter prediction or intra prediction is performed on smooth images in units of large blocks. This enables performance of efficient prediction on both complicated images and smooth images.

Here, the present inventors have focused an attention on that a large block size is appropriate for a region on which strong blur has been added and is a smooth region with no complicated pattern. Then, the present inventors have conceived of that if a region of an image on which strong blur is to be added is acquired without analyzing the image after blur processing, it is unnecessary to select the block size of the region in block size selection processing for coding the blurred image, thereby reducing calculation amount for coding. This eliminates the need to perform block size selection processing by detecting, from the image after blur processing, the region on which strong blur has been added.

Compared with this, according to a conventional art for block size selection, a coding target image itself is an analysis target. As a result, in the case where such a conventional art for block size selection is applied to an image on which blur processing has not yet been performed, a selected block size is not necessarily appropriate for the image on which the blur processing has been performed.

Figure 19:
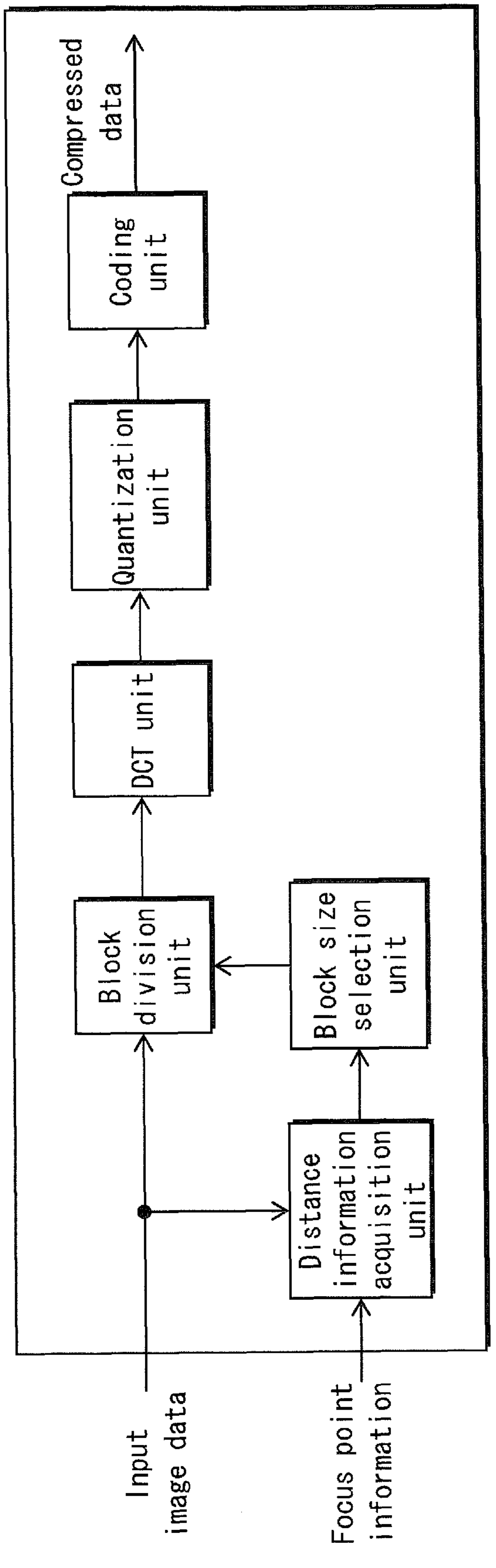
FIG. 19 is a block diagram showing an ultrasonic diagnostic device including a conventional coding unit.

Patent Literature 1 discloses an ultrasonic diagnostic device for selecting the block size with use of distance information and focus point information. FIG. 19 is a block diagram showing the ultrasonic diagnostic device disclosed in Patent Literature 1. This ultrasonic diagnostic device codes reflected signals indicating depth information, as input image data. The image resolution by the ultrasonic diagnostic device is determined based on a distance from the focus point.

Accordingly, by determining the block size with use of the distance information and the focus point information, the ultrasonic diagnostic device achieves both high image quality of a region having a high resolution and high compression of a region having a low resolution.

However, unless which type of blur processing is to be performed is determined even if the distance and the focus point are determined, the blur degree is not uniquely determined. That is, in the case where blur processing is performed on a single subject that is not on a focus point in an image, a region of an image after the blur processing in which the subject is included differs of course between the case where the blur processing is performed on only the foreground of the focus point and the case where the blur processing is performed on only the background of the focus point. In other words, an appropriate block size for image coding after blur processing is not necessarily the same between different types of blur processing. According to the method disclosed in Patent Literature 1 for selecting the block size based on only the distance and the focus point, which are applied to any type of blur processing among various types of blur processing, it is not always true to obtain an appropriate block size for an image after blur processing.

Figure 20:
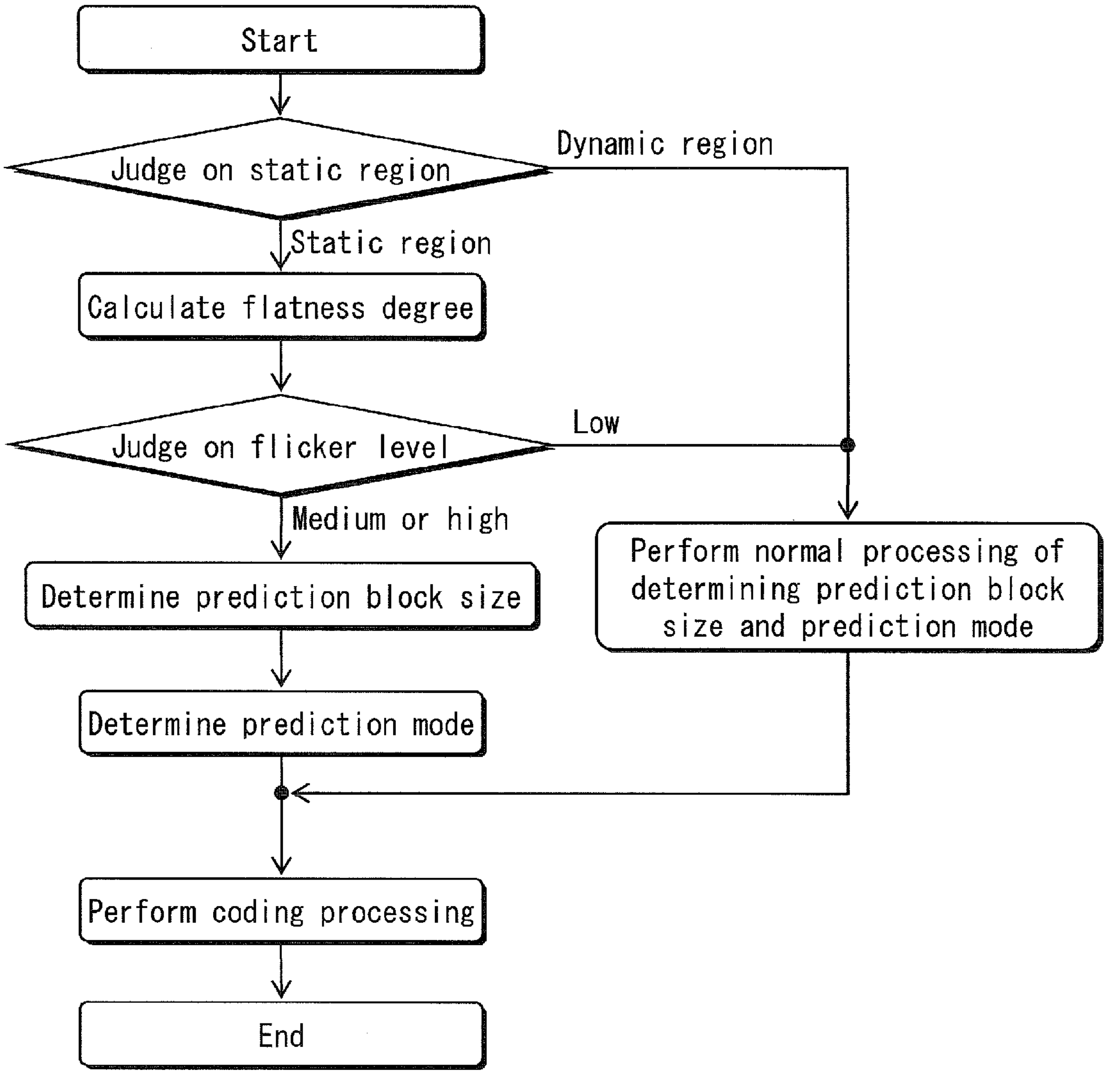
FIG. 20 is a flowchart showing a conventional coding control method.

Also, Patent Literature 2 discloses a coding control method of suppressing flicker based on the smooth degree of an image. FIG. 20 is a flowchart showing the coding control method disclosed in Patent Literature 2. According to the art of Patent Literature 2, judgment is made as to whether each of regions is a static region. If the region judged to a static region, the flatness degree of the static region is calculated based on dispersion of pixel values. The flicker level of the static region is judged based on the calculated flatness degree and a quantization step size. The art of Patent Literature 2 increases a block size of a region having a high flicker level so as to generate a compressed image with suppressed flicker.

However, a small block size is appropriate for a complicated image although being a smooth region, as described above. Although it is true that a large block size is appropriate for a region on which strong blur has been added, a region on which no blur is to be added has possibilities of being a smooth region where a complicated pattern is included. Therefore, according to the art of Patent Literature 2 that determines the block size based on only whether a region is a smooth region, it is impossible to select an appropriate block size. Also, according to the art of Patent Literature 2, it is impossible to detect, from an image on which blur processing has not yet been performed, a region on which strong blur is to be added in blur processing that is appropriate for a large block size.

In view of the above problems, the present inventors have conceived of the present invention that is characterized in storing the blur degree for pixel unit for blur processing, and determining the block size with use of the stored blur degree. This enables to selection of an appropriate block size for a strongly blurred region to code a blurred image, and eliminates the need of intra prediction with use of a small block size for coding. As a result, it is possible to reduce calculation amount for coding with no analysis on the image after blur processing.

Embodiments

The following describes embodiments of the present invention with reference to the figures.

Embodiment 1

FIG. 1 is a block diagram showing an image coding device relating to Embodiment 1 of the present invention.

A stereo photograph coding system shown in FIG. 1 photographs a subject so as to be stereoscopically viewed, and codes stereoscopic video signals resulting from the photographing. This stereoscopic photograph coding system includes cameras 100*a* and 100*b* for photographing a main image and a sub image that have disparity therebetween, respectively, an image coding device 200, a blur parameter input unit 300, and a storage unit 400.

<Cameras 100*a* and 100*b*>

The cameras 100*a* and 100*b* are located at a distance of 6.5 cm from each other that is an average interval between human eyes. The cameras 100*a* and 100*b* each photograph a subject, and output video signals resulting from the photographing to the image coding device 200.

For convenience of the following description, respective video signals output by the cameras 100*a* and 100*b* are collectively referred to as stereoscopic video signals. Also, the main image is determined to an image contained in video signals output by the camera 100*a*, and the sub image is determined to an image contained in video signals output by the camera 100*b*, here.

A stereoscopic image of the subject is composed of the main image and the sub image. The cameras 100*a* and 100*b* generate and output respective pictures at the same time.

<Blur Parameter Input Unit 300>

The blur parameter input unit 300 is a user interface for receiving input of a blur parameter, and is composed of a touch panel and arrow keys. The blur parameter is for adding blur to stereoscopic video signals containing a main image and a sub image. Here, the blur to be added differs from blur due to an actual photographic lens.

The blur parameter input unit 300 receives input, as the blur parameter, one, both, or none of respective adjustment values of blur $S_n$ and $S_f$ in points forward and backward a subject, one, both, or none of respective weighting coefficients $W_n$ and $W_f$ forward and backward the subject, focus point information P of the subject, a base-line length l between the cameras 100*a* and 100*b*, a pixel size m, a focal distance $f_p$, and lens information that differs from lens information of the actual photographic lens, namely, a virtual focal distance $f_v$ and a virtual aperture value (F-number).

In order to exhibit a stereoscopic effect for stereoscopic image display by causing a viewer to feel the sense of perspective with a small degree of projection forward and a large degree of depth backward, a user performs operations, via the user the blur parameter input unit 300, to increase the adjustment value of blur $S_n$ or the weighting coefficient $W_n$ in the point forward the subject, or to decrease the adjustment value of blur $S_f$ or the weighting coefficient $W_f$ in the point backward the subject. This increases the blur value in the point forward the subject. On the contrary, in order to exhibit a stereoscopic effect by emphasizing the subject positioned forward and adding intentionally blur to the background of the subject so as to accentuate the subject positioned forward, the user performs operations, via the blur parameter input unit 300, to increase the adjustment value of blur $S_f$ or the weighting coefficient $W_f$ in the point backward the subject, or to decrease the adjustment value of blur $S_n$ or the weighting coefficient $W_n$ in the point forward the subject. This increases the blur value in the point backward the subject.

The increase in adjustment values of blur $S_n$ and $S_f$ results in blur processing of uniform blur addition on forward and backward the focus point, respectively, irrespective of subject distance information. Also, the increase in weighting coefficients $W_n$ and $W_f$ results in blur processing depending on the subject distance information. That is, as the subject is distant from the focus point, stronger blur is added.

The lens information and the weighting coefficient are input by a user calling an item setting menu via the touch panel and the arrow keys and setting items. The focus point information is input by the user performing operations of designating a point of a subject included in a main image photographed by the camera 100*a* that is displayed on the touch panel.

The blur parameter input unit 300 receives the set blur parameter, and outputs the blur parameter to the image coding device 200. This enables the blur processing unit 202 to perform blur processing for representing blur at an arbitrary degree that cannot be represented by a virtual photographic lens or an actual photographic lens.

<Storage Unit 400>

The storage unit 400 is a recording medium for storing image data (locally-decoded image signals which are later described) output by the image coding device 200.

<Image Coding Device 200>

The image coding device 200 codes stereoscopic video signals output by the cameras 100*a* and 100*b* to generate and output coded video signals. Here, the image coding device 200 relating to the present embodiment performs blur processing on both a main image and a sub image contained in the stereoscopic video signals, and codes the stereoscopic video signals on which the blur processing has been performed. Also, the image coding device 200 codes two video signals contained in the stereoscopic video signals for each region constituting each of pictures contained in the two video signals. The image coding device 200 codes image signals resulting from adding blur to video signals output by the camera 100*a*, in accordance with the H.264 MVC (Multi View Coding) standard. The image coding device 200 codes each picture contained in the video signals, as an I-picture, a P-picture, or a B-picture.

With respect to an I-picture and a P-picture, the image coding device 200 performs intra prediction coding.

With respect to a P-picture and a B-picture, the image coding device 200 performs inter prediction coding (motion compensated prediction coding).

Also, in order to code image signals resulting from adding blur to video signals output by the camera 100*b*, the image coding device 200 performs disparity compensated prediction coding. The image coding device 200 codes each of pictures contained in the video signal, as a P-picture.

In other words, the image coding device 200 predicts, based on a picture of the main image, a picture of the sub image that has been generated simultaneously with the picture of the main image, and then codes the picture of the sub image based on a result of the prediction.

The image coding device 200 includes an image acquisition unit 206, a disparity acquisition unit 207, a blur processing unit 202, a selector 203, switches 204*a*, 204*b*, and 204*c*, a subtractor 205, block size determination units 210*a* and 210*b*, block division units 212*a* and 212*b*, an intra prediction unit 213, a detection unit 214, a compensation unit 215, a transform unit 216, a quantization unit 217, a variable-length coding unit 218, an inverse quantization unit 219, an inverse transform unit 220, and an adder 221.

<Image Acquisition Unit 206>

The image acquisition unit 206 acquires respective image signals output by the cameras 100*a* and 100*b*, and outputs the acquired image signals to the blur processing unit 202.

<Disparity Acquisition Unit 207>

The disparity acquisition unit 207 acquires, for each pixel unit, a value indicating a disparity or a value indicating a distance between the camera 100 and a subject relating to the image signals acquired by the image acquisition unit 206, and outputs the acquired value indicating the disparity or the value indicating the distance to the blur processing unit 202. In the present embodiment, the disparity acquisition unit 207 includes a disparity detection subunit 201 that generates the value indicating the disparity.

<Disparity Detection Subunit 201>

The disparity detection subunit 201 detects disparity between the main image and the sub image output by the cameras 100*a* and 100*b*, respectively. The disparity detection subunit 201 detects the disparity by calculating respective points between the main image and the sub image in correspondence with each other, and detecting, as the number of pixels, a positional offset in the horizontal direction between a unit region of one of the images and a unit region of the other image in correspondence with each other. The disparity detection subunit 201 outputs disparity information d indicating the detected disparities within the main image to the blur processing unit 202.

In the present embodiment, the block matching method is used for disparity detection. According to the block matching method, firstly, the disparity detection subunit 201 extracts a unit region of 16×16 pixels from a comparison source image. Next, the disparity detection subunit 201 extracts a plurality of regions each having a size of 16×16 pixels among search target regions of a comparison target image. The disparity detection subunit 201 calculates, for each of the extracted regions, the SAD (Sum of Absolute Difference) in brightness that is the sum of the absolute values of the difference in brightness between each pixel in the extracted region and a pixel in the unit region corresponding to the pixel in the extracted region. Then, the disparity detection subunit 201 calculates, in units of regions, a point in the comparison target image that corresponds to a point in the comparison source image, by searching for a point to be extracted where the SAD is the smallest.

<Blur Processing Unit 202>

With use of the blur parameter output by the blur parameter input unit 300 and the disparity information or the distance information output by the disparity acquisition unit 207, the blur processing unit 202 determines a blur matrix to be added to each of the main image and the sub image for each pixel unit, which have been output by the image acquisition unit 206. In the present embodiment, the blur processing unit 202 uses the disparity information output by the disparity acquisition unit 207. The blur processing unit 202 outputs a blur value for each pixel unit calculated based on the blur matrix to the block size determination units 210*a* and 210*b*.

Also, the blur processing unit 202 performs blur processing on the main image and/or the sub image based on the blur matrix, and outputs blurred image data of the main image and/or the sub image resulting from the blur processing to the selector 203.

In the present embodiment, the pixel unit is composed of one pixel.

The following describes the flow of blur processing. The blur processing unit 202 calculates distribution of distance between the camera and a subject with use of disparity information d, generates a blur matrix based on a parameter output by the blur parameter input unit 300 and the distance between the camera and the subject, and convolves the blur matrix on main image data or sub image data for each pixel region to perform blur addition. Also, the blur processing unit 202 calculates blur values based on the blur matrix, and outputs the calculated blur values to the block size determination units 210*a* and 210*b*.

Figure 2A:
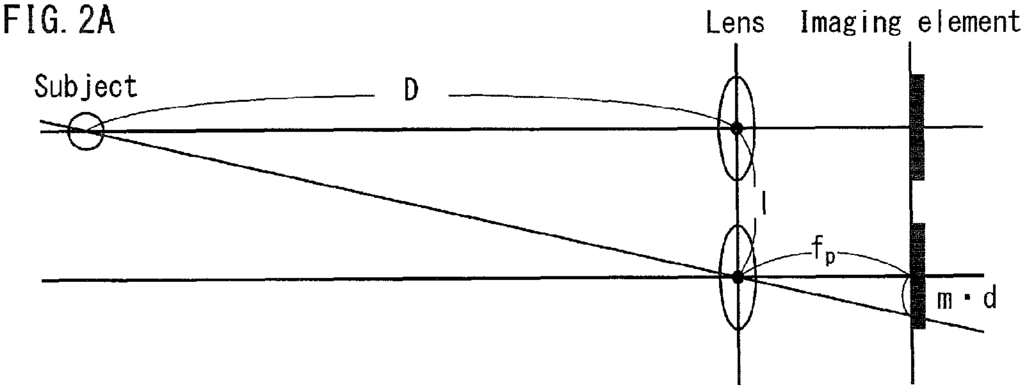
FIG. 2A to FIG. 2B show a photographic optical system and a blur value relating to Embodiment 1 of the present invention.

Description is given with reference to FIG. 2A to FIG. 2D. Firstly, the blur processing unit 202 calculates the distribution of distance between the camera and the subject based on disparity information d for each pixel unit. As shown in FIG. 2A, a distance D between the camera and the subject is calculated by the following Equation 2, where disparity information is represented as d and the horizontal length of each pixel of an imaging element used for photographing is represented as m.

$$D = \frac{f_p \cdot 1}{m \cdot d} \quad \text{[Equation 1]}$$

Note that, as described above, the value $f_p$ represents the focal distance of the lens, and the value 1 represents the base-line length between the cameras 100_a_ and 100_b_.

The above calculation for each pixel unit results in the distribution of distance between the camera and the subject photographed in the main image and/or the sub image.

Here, a blurred circle that is imaged by points that are offset from the focus point P is called a circle of confusion. In the present embodiment, the blur processing unit 202 determines the size of the blur matrix with use of the diameter σ of a virtual circle of confusion.

The distance L between the focus point P and the camera is calculated, by assigning disparity information at the focus point P to d in the above equation for calculating the distance D. Similarly, the distance X between an arbitrary subject and the camera is calculated as a value of the distance D, by assigning disparity information of the subject to d in the above equation for calculating the distance D.

The blur processing unit 202 calculates the diameter σ of a circle of confusion at the distance X from the camera as follows, with use of characteristic values of an optical system including the focal distance $f_v$, the F-number F, the distance L between the focus point and the camera, and the distance X between the subject and the camera.

In the present embodiment, as the F-number F, a virtual value output by the blur parameter input unit 300 is used. Also, the blur processing unit 202 performs weighting on the diameter σ of a circle of confusion backward the focus point and the diameter σ of a circle of confusion forward the focus point, with use of the weight adjustment values of blur $S_n$ and $S_f$ and the weighting coefficients $W_n$ and $W_f$ output by the blur parameter input unit 300. As described above, in the case where the adjustment values of blur $S_f$ and $S_n$ satisfy $S_f > S_n$ or the weighting coefficients $W_f$ and $W_n$ satisfy $W_f > W_n$, blur is stronger backward than forward. On the contrary, in the case where the adjustment values of blur $S_f$ and $S_n$ satisfy $S_f < S_n$ or the weighting coefficients $W_f$ and $W_n$ satisfy $W_f < W_n$, blur is stronger forward than backward. Furthermore, in the case where the adjustment values of blur $S_f$ and $S_n$ are each zero, there is no adjustment value to be added, and blur occurs due to a virtual optical system. On the contrary, as the adjustment values of blur $S_f$ and $S_n$ increase, blur is added on more uniformly forward or backward the focus point. Moreover, in the case where the weighting coefficients $W_f$ and $W_n$ are each one, there is no weighting to be performed, and blur occurs due to a virtual optical system. On the contrary, as the weighting coefficients $W_f$ and $W_n$ increase, blur occurs that more strongly depends on the distance information of the subject. When weighting coefficients $W_f$ and $W_n$ are each zero, blur forward and backward do not depend on the distance information of the subject.

In the case where the equation for calculating the diameter of a circle of confusion is approximated, and then an adjustment value of blur is added and weighting is performed, the diameter σ of a virtual circle of confusion backward the focus point is calculated by the following Equation 2.

$$\sigma = \frac{W_f \cdot f_v^2 \cdot (X - L)}{FLX} + S_f \quad \text{[Equation 2]}$$

Also, the diameter σ of a virtual circle of confusion forward the focus point is calculated by the following Equation 3.

$$\sigma = \frac{W_n \cdot f_v^2 \cdot (L - X)}{FLX} + S_n \quad \text{[Equation 3]}$$

Figure 2B:
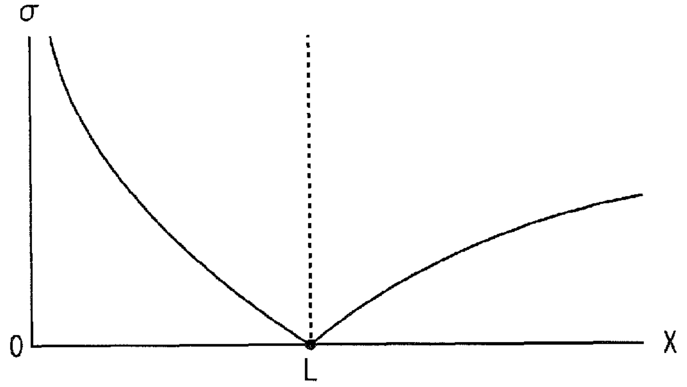

With respect to each of a main image and a sub image for each pixel unit, a blur matrix is calculated, by assigning disparity information d to the above equation for calculating the distance D to obtain the distance X, and assigning the distance X to the equation for calculating the diameter σ of a virtual circle of confusion. FIG. 2B shows the relation between each of the respective diameters σ of the virtual circles of confusion calculated by Equations 2 and 3 and the distance. Next, as shown in FIG. 3A, a blur matrix is generated such that, in the inside and the outside of a virtual circle of confusion having a diameter σ that indicates the size of the blur matrix, filer coefficients are each one and filer coefficients are each zero, respectively.

Then, the generated blur matrix is convolved on main image data or sub image data for each pixel region to perform blur addition. Here, all the filter coefficients of the blur matrix are each divided by the sum of all the filter coefficients of the blur matrix to generate a convolution matrix so as to have the sum of all the filter coefficients in the inside of the virtual circle of confusion is one. Convolution is performed with use of the generated convolution matrix.

Also, the blur processing unit 202 calculates a blur value for each pixel unit, based on the blur matrix for each pixel unit calculated above. The blur value is a value indicating a range where filter coefficients of the blur matrix are each equal to or higher than a threshold value. In the case where the range is a circle, the value indicating the range is the diameter of the circle, or in the case where the range is a square, the value indicating the range is the length of the diagonal line of the square, for example.

In the present embodiment, the blur matrix is generated such that, in the inside and the outside of a virtual circle of confusion having the diameter σ, filer coefficients are each one and filer coefficients are each zero, respectively. Accordingly, the threshold value is determined to one, and a blur value as a value indicating the circle having the diameter σ is determined to σ.

The blur processing unit 202 outputs the blur value for each pixel unit calculated such as described above to the block size determination units 210_a_ and 210_b_.

<Selector 203>

The selector 203 acquires respective video signals output by the cameras 100_a_ and 100_b_, and alternately outputs the video signals, which have been output by the cameras 100_a_ and 100_b_, to the switch 204_a_, the subtractor 205, and one of the block division units 212_a_ and 212_b_.

In the present embodiment, the selector 203 switches between the video signals to be output for each picture unit. In other words, the selector 203 simultaneously acquires, from the blur processing unit 202, the main image and the sub image on which blur processing have been performed, and then outputs the acquired main image and sub image in this order.

<Subtractor 205>

The subtractor 205 calculates, for each block, the difference between a coding target image contained in the video signals output by the selector 203 and a prediction image contained in the prediction signals output by the switch 204*b*. The subtractor 205 outputs a prediction residual signal indicating the calculated difference to the switch 204*a*.

Here, with respect to each image composed of blocks that is an I-picture, a P-picture, or a B-picture, the subtractor 205 calculates the difference above described to output a prediction residual signal.

<Switch 204*a*>

In the case where a coding target image is a main image that is an I-picture and intra prediction is not to be performed, the switch 204*a* connects the selector 203 to the transform unit 216, and transfers video signals containing the coding target image from the selector 203 to the transform unit 216.

Also, in the case where a coding target image is a main image that is an I-picture and intra prediction is to be performed, or in the case where a coding target image is an image (main image or sub image) that is a P-picture or a B-picture, the switch 204*a* connects the subtractor 205 to the transform unit 216, and transfers a prediction residual signal of one of the I-picture, the P-picture, and the B-picture from the subtractor 205 to the transform unit 216.

<Transform Unit 216>

The transform unit 216 acquires, for each block, video signals or prediction residual signals as image signals via the switch 204*a*, and performs DCT (Discrete Cosine Transform) on the acquired image signals. The DCT is one kind of orthogonal transform. In other words, the transform unit 216 transforms the image signals into a DCT coefficient that is a frequency coefficient, namely, transforms the image signals from spatial domain to frequency domain. Then, the transform unit 216 outputs the frequency coefficient to the quantization unit 217.

<Quantization Unit 217>

The quantization unit 217 acquires the frequency coefficient from the transform unit 216, and quantizes the acquired frequency coefficient. In other words, the quantization unit 217 divides the frequency coefficient by a quantization step to generate a quantization value. Here, the quantization unit 217 quantizes each of coding target blocks with use of a predetermined quantization step in accordance with an image coding standard. In the present embodiment, the H.264 standard is used as the image coding standard.

<Variable-Length Coding Unit 218>

The variable-length coding unit 218 performs variable-length coding on the quantization value generated by the quantization unit 217 and a motion vector or a disparity vector output by the detection unit 214 to generate and output coded stereoscopic video signals. This variable-length coding is one type of reversible coding.

<Inverse Quantization Unit 219>

The inverse quantization unit 219 inverse-quantizes the quantization value generated by the quantization unit 217 to generate an inverse quantization frequency coefficient. In other words, the inverse quantization unit 219 multiplies the quantization value by the quantization step used by the quantization unit 217 to generate an inverse quantization frequency coefficient.

Note that the inverse quantization frequency coefficient generated here includes a quantization error, unlike the frequency coefficient generated by the transform unit 216.

<Inverse Transform Unit 220>

The inverse transform unit 220 performs, on the inverse quantization frequency coefficient generated by the inverse quantization unit 219, performs an inverse orthogonal transform that is inverse to the orthogonal transform performed by the transform unit 216. In the present embodiment, the inverse transform unit 220 performs IDCT (Inverse Discrete Cosine Transform) as the inverse orthogonal transform. In other words, the inverse transform unit 220 transforms the inverse quantization frequency coefficient into image signals, namely, transforms the inverse quantization frequency coefficient from frequency domain to spatial domain. Then, the inverse transform unit 220 outputs the image signals to the adder 221.

<Adder 221>

In the case where a coding target image is a main image that is an I-picture and intra prediction is not to be performed, the adder 221 stores, in the storage unit 400, the image signals output by the inverse transform unit 220 as locally-decoded image signals.

Also, in the case where a coding target image is a main image that is an I-picture and intra prediction is to be performed, or in the case where a coding target image is an image (main image or sub image) that is a P-picture or a B-picture, the adder 221 adds the image signals output by the inverse transform unit 220 and the prediction signals output by the switch 204*c*. Then, the adder 221 outputs a result of the addition to the intra prediction unit 213 as locally-decoded image signals, and also stores the result of the addition in the storage unit 400.

<Block Size Determination Unit 210*a*>

In the case where a coding target image is an image that is an I-picture, a P-picture or a B-picture and intra prediction is to be performed, the block size determination unit 210*a* acquires a blur value for each of coding target regions of the coding target image from the blur processing unit 202, and compares the acquired blur value with a threshold value.

In the present embodiment, the H.264 standard is used as the coding method as described above, and accordingly the block size of 16×16 and the block size of 4×4 are available for intra prediction. The threshold value is determined to four pixels here. With respect to a region having a blur value higher than four pixels, the block size of 4×4 is not used.

If the blur value is higher than the threshold value, the block size determination unit 210*a* outputs, to the block division unit 212*a*, block size information indicating the limitation of the block size of the block unit to be used for prediction by the intra prediction unit 213 to 16×16, which is a large block size.

On the contrary, if the blur value is equal to or lower than the threshold value, the block size determination unit 210*a* outputs, to the block division unit 212*a*, block size information indicating 4×4, which is a small block size, in addition to the block size of 16×16.

<Block Division Unit 212*a*>

The block division unit 212*a* divides the coding target image output by the selector 203 into blocks each having a block size indicated by the block size information output by the block size determination unit 210*a*.

If the block size information indicates the limitation to 16×16 for example, the block division unit 212*a* divides the coding target image into divided blocks each having the block size of 16×16, and outputs the image, which has been divided into the blocks, to the intra prediction unit 213.

Compared with this, if the block size information indicates the two types of block sizes of 16×16 and 4×4, the block division unit 212*a* prepares two types of images, namely an image divided into blocks each having the size of 16×16 and an image divided into blocks each having the size of 4×4. Then, the block division unit 212*a* outputs the two types of images, which have been each divided into the blocks, to the intra prediction unit 213.

<Intra Prediction Unit 213>

The intra prediction unit 213 performs intra prediction on locally-decoded image signals containing a single picture output by the adder 221 with use of a block size of each of divided blocks output by the block division unit 212*a*, with respect to each of four points that are left, up, upper right, and upper left relative to a point of a coding target image.

If receiving block information indicating the limitation to the block size of 16×16 from the block division unit 212*a* for example, the intra prediction unit 213 searches the four points for a block that is the same as or similar to each of coding target blocks, with use of only the block size of 16×16.

Compared with this, if receiving block size information indicating two types of block sizes of 16×16 and 4×4, the intra prediction unit 213 searches the four points for a block that is the same as or similar to each of the coding target blocks, with use of the block sizes of 16×16 and 4×4.

Then, the intra prediction unit 213 outputs, to the switches 204*b* and 204*c*, a prediction signal of each block with use of the most similar block resulting from searching.

<Block Size Determination Unit 210*b*>

In the case where a coding target image is a main image that is a P-picture or a B-picture, or in the case where a coding target image is a sub image that is a P-picture, the block size determination unit 210*b* acquires a blur value for each of coding target regions of the coding target image from the blur processing unit 202, and compares the acquired blur value with a threshold value.

In the present embodiment, the H.264 standard is used as the coding method as described above, and accordingly the block size of 16×16 and the block size of 8×8 are available for inter prediction. The threshold value is determined to eight pixels here. With respect to a region having a blur value higher than eight pixels, the block size of 8×8 is not used. Note that although the block size of 16×8 and the block size of 8×16 are also available in accordance with the H.264 standard, these block sizes are not used in the present embodiment.

If the blur value is higher than the threshold value, the block size determination unit 210*b* outputs, to the block division unit 212*b*, block size information indicating the limitation of the block size of the block unit to be used for detection of a motion vector or a disparity vector by the detection unit 214 to 16×16, which is a large block size. The threshold value is determined to eight pixels here.

On the contrary, if the blur value is equal to or lower than the threshold value, the block size determination unit 210*b* outputs, to the block division unit 212*b*, block size information indicating 8×8, which is a small block size, in addition to the block size of 16×16.

<Block Division Unit 212*b*>

The block division unit 212*b* divides the coding target image output by the selector 203 into blocks each having a block size indicated by the block size information output by the block size determination unit 210*b*.

If the block size information indicates the limitation to 16×16 for example, the block division unit 212*b* divides the coding target image into blocks each having the block size of 16×16, and outputs the image, which has been divided into the blocks, to the detection unit 214.

Compared with this, if the block size information indicates the two types of block sizes of 16×16 and 8×8, the block division unit 212*b* prepares two types of images, namely an image divided into blocks each having the size of 16×16 and an image divided into blocks each having the size of 8×8. Then, the block division unit 212*b* outputs the two types of images, which have been each divided into the blocks, to the detection unit 214.

<Detection Unit 214>

In the case where the coding target image, which has been divided into the blocks by the block division unit 212*b*, is a main image that is a P-picture or a B-picture, the detection unit 214 detects a motion vector of the coding target image for each block unit.

In other words, the detection unit 214 refers to, as a reference image, the locally-decoded image signals containing another main image that is an I-picture or a P-picture that has been coded and decoded, which is stored in the storage unit 400.

The detection unit 214 searches the reference image for a block that is the same as or similar to each of coding target blocks of the coding target image, thereby to detect a motion of each block of the coding target image as a motion vector.

Then, the detection unit 214 outputs the motion vector to the compensation unit 215 and the variable-length coding unit 218.

In the case where the coding target image that has been divided into blocks by the block division unit 212*b* is a sub image that is a P-picture, the detection unit 214 detects a disparity vector of the coding target image for each block.

In other words, the detection unit 214 refers to, as a reference image, the locally-decoded image signals indicating a main image that is an I-picture, a P-picture or a B-picture that has been coded and decoded, which is stored in the storage unit 400.

The detection unit 214 searches the reference image for a block that is the same as or similar to each of coding target blocks of the coding target image, thereby to detect a positional relation between each block of the coding target image and a block that is the same as or similar to each block, as a disparity vector (disparity).

Note that the sub image divided into the coding target blocks and the main image that is the reference image have been generated simultaneously by the cameras 100*a* and 100*b*, respectively. Then, the detection unit 214 outputs the disparity vector to the compensation unit 215 and the variable-length coding unit 218.

Note that the disparity vector represents the positional relation between each coding target block and the block that is the same as or similar to the coding target block, as a positional offset in the horizontal direction.

In order to detect motion vector or disparity vector, if receiving block information indicating the limitation to the block size of 16×16 from the block division unit 212*b*, the detection unit 214 searches for a block that is the same as or similar to each block included in a region of 32×32 pixels surrounding the coding target block with use of only the block size of 16×16.

Compared with this, if receiving block size information indicating two types of block sizes of 16×16 and 8×8, the detection unit 214 searches for a block that is the same as or similar to each block included in a region of 32×32 pixels surrounding the coding target block with use of the two types of block sizes of 16×16 and 8×8.

Then, the detection unit 214 outputs, to the compensation unit 215, a motion vector or a disparity vector of each block with use of the most similar block.

<Compensation Unit 215>

If acquiring a motion vector from the detection unit 214, the compensation unit 215 performs motion compensation with use of the acquired motion vector and a reference image to generate a prediction signal, and outputs the generated prediction signal. In other words, each of the blocks that is the same as or similar to a block included in the reference image that has been searched for by the detection unit 214 is spatially shifted based on the motion vector.

Compared with this, if acquiring a disparity vector from the detection unit 214, the compensation unit 215 performs disparity compensation with use of the acquired disparity vector and the reference image to generate a prediction signal, and outputs the generated prediction signal.

In other words, each of the blocks that is the same as or similar to a block included in the reference image that has been searched for by the detection unit 214 is spatially shifted based on the disparity vector.

<Switch 204*c*>

In the case where a coding target image is a main image that is an I-picture and intra prediction is not to be performed, the switch 204*c* opens between the intra prediction unit 213 and the adder 221, and opens between the compensation unit 215 and the adder 221.

Also, in the case where a coding target image is an image (main image or sub image) that is an I-picture, a P-picture, or a B-picture and intra prediction is to be performed, the switch 204*c* connects the intra prediction unit 213 to the adder 221, and transfers a prediction signal from the intra prediction unit 213 to the adder 221.

Also, in the case where a coding target image is an image (main image or sub image) that is a P-picture or a B-picture, the switch 204*c* connects the compensation unit 215 to the adder 221, and transfers a prediction signal from the compensation unit 215 to the adder 221.

<Switch 204*b*>

In the case where a coding target image is an image (main image or sub image) that is an I-picture, a P-picture, or a B-picture and intra prediction is to be performed, the switch 204*b* connects the intra prediction unit 213 to the subtractor 205, and transfers a prediction signal from the intra prediction unit 213 to the subtractor 205.

Also, in the case where a coding target image is an image (main image or sub image) that is a P-picture or a B-picture, the switch 204*b* connects the compensation unit 215 to the subtractor 205, and transfers a prediction signal from the compensation unit 215 to the subtractor 205.

Furthermore, in the case where a coding target image is an image (main image or sub image) that is a P-picture or a B-picture and the intra prediction unit 213 and the compensation unit each generate a prediction signal, the switch 204*b* transfers, to the subtractor 205, one of the generated prediction signals that relates to each block that is more similar to the coding target block generated by the intra prediction unit 213 and the compensation unit 215.

<Operations>

FIG. 4 to FIG. 8 are each a flowchart showing operations by the image coding device 200 relating to the present embodiment.

The image coding device 200 sequentially codes pictures contained in stereoscopic video signals having disparity.

In image coding processing, in order to enhance a main subject and exhibit a stereoscopic effect, the image coding device 200 firstly sets a blur parameter for adding arbitrary blur (Step S10). The blur parameter is, for example, lens information for adding blur to regions other than a region where the main subject is included.

After completing the settings of the blur parameter, the image coding device 200 acquires image signals (Step S20), and detects disparity between two images contained in the acquired image signals (Step S30).

The image coding device 200 selects a coding target image (Step S40). In the present embodiment, both a main image and a sub image are selected because both these images are blur addition targets for coding.

The blur processing unit 202 calculates a blur value to be added to the stereoscopic video signals based on the blur parameter set in Step S10 and disparity information indicating the disparity detected in Step S30, and then performs blur processing on the stereoscopic video signals by adding the calculated blur value to the stereoscopic video signals (Step S50).

The image coding device 200 generates coding target signals in order to code the stereoscopic video signals containing the blurred image to which the blur value has been added (Step S60).

Here, the following describes the sequence of operations in S60 for generating coding target signals. Firstly, judgment is made as to whether the coding target image is a main image (Step S61). Here, this judgment is made by a control unit included in the image coding device 200.

If judging that the coding target image is a main image (Step S61: Y), the control unit further judges whether motion compensated prediction coding is to be performed on the coding target image (Step S62). For example, if the coding target image is to be coded as blocks of a P-picture or a B-picture, the control unit judges that motion compensated prediction coding is to be performed (Step S62: Y). Compared with this, if the coding target image is to be coded as blocks of an I-picture, the control unit judges that motion compensated prediction coding is not to be performed (S62: N).

If judging that motion compensated prediction coding is to be performed (Step S62: Y), the control unit controls the switch 204*a* to connect the subtractor 205 to the transform unit 216, controls the switch 204*b* to connect the compensation unit 215 to the subtractor 205, and controls the switch 204*c* to connect the compensation unit 215 to the adder 221.

Next, the block size determination unit 210*b* determines a block size for motion vector detection based on blur values of the coding target image (Step S64*b*). Firstly, the block size determination unit 210*b* acquires a blur value of each of coding target regions of the coding target image from the blur processing unit 202, and compares the acquired the blur value with a threshold value (Step S211). If judging that the blur value is higher than the threshold value, the block size determination unit 210*b* outputs, to the block division unit 212*b*, block size information indicating the limitation of the block size of the block unit to be used for motion vector detection by the detection unit 214 to 16×16, which is a large block size (Step S212). On the contrary, if judging that the blur value is equal to or lower than the threshold value, the block size determination unit 210*b* outputs, to the block division unit 212*b*, block size information indicating 8×8, which is a small block size, in addition to the block size of 16×16 (Step S213).

The block division unit 212*b* divides the coding target image output by the selector 203 into blocks each having a block size indicated by the block size information output by the block size determination unit 210*b* (Step S65*b*).

Next, the detection unit 214 searches for a block that is the same as or similar to each of blocks of the coding target image, with use of the block size received by the block division unit 212*b* to detect a motion vector. The detection unit 214 outputs a motion vector of each block with use of the most similar block (Step S661).

If receiving block information indicating the limitation to the block size of 16×16 from the block division unit 212*b*, the detection unit 214 searches for a block for motion vector detection that is the same as or similar to each block included in a region of 32×32 pixels surrounding the coding target block with use of only the block size of 16×16.

Compared with this, if receiving block size information indicating two types of block sizes of 16×16 and 8×8, the detection unit 214 searches for a block that is the same as or similar to each block included in a region of 32×32 pixels surrounding the coding target block with use of the two types of block sizes of 16×16 and 8×8. Then, the detection unit 214 outputs, to the compensation unit 215, a motion vector of each block with use of the most similar block.

Furthermore, the compensation unit 215 performs motion compensation with use of the detected motion vector to generate a prediction signal of each block of the coding target image (Step S662).

Also, the subtractor 205 subtracts an image contained in the prediction signal from the coding target image to generate a prediction residual signal (Step S67*b*).

Also, if a coding target image is an I-picture and the control unit judges that motion compensated prediction coding is not to be performed and intra prediction coding is to be performed in S406, or if a coding target image is a P-picture or a B-picture and the control unit judges that intra prediction coding is to be performed (Step S63: Y), the control unit controls the switch 204*a* to connect the subtractor 205 to the transform unit 216, controls the switch 204*b* to connect the intra prediction coding unit 213 to the subtractor 205, and controls the switch 204*c* to connect the intra prediction coding unit 213 to the adder 221.

Next, the block size determination unit 210*a* determines a block size for intra prediction based on blur values of the coding target image (S64*a*). Firstly, the block size determination unit 210*a* acquires a blur value of each of coding target regions of the coding target image from the blur processing unit 202, and compares the acquired blur value with a threshold value (Step S201). If judging that the blur value is higher than the threshold value, the block size determination unit 210*a* outputs, to the block division unit 212*a*, block size information indicating the limitation of the block size of the block unit to be used for block searching by the intra prediction unit 213 to 16×16, which is a large block size (Step S202). On the contrary, if judging that the blur value is equal to or lower than the threshold value, the block size determination unit 210*a* outputs, to the block division unit 212*b*, block size information indicating 8×8, which is a small block size, in addition to the block size of 16×16 (Step S203).

The block division unit 212*a* divides the coding target image output by the selector 203 into blocks each having a block size indicated by the block size information output by the block size determination unit 210*a* (Step S65*a*).

If receiving block information indicating the limitation to the block size of 16×16 from the block division unit 212*a*, the intra prediction unit 213 performs intra prediction by searching four points that are left, up, upper right, and upper left relative to a point of the coding target image for a block that is the same as or similar to each of coding target blocks, with use of only the block size of 16×16.

Compared with this, if receiving block size information indicating two types of block sizes of 16×16 and 4×4, the intra prediction unit 213 performs intra prediction by searching the four points for a block that is the same as or similar to each of the coding target blocks, with use of the two types of block sizes of 16×16 and 4×4.

Then, the intra prediction unit 213 outputs, to the switches 204*b* and 204*c*, a prediction signal of each block with use of the most similar block (Step S66).

Also, the subtractor 205 subtracts an image contained in the prediction signal from the coding target image to generate a prediction residual signal (Step S67*a*).

Also, if judging that the coding target image is a sub image (Step S61: N), the control unit controls the switch 204*a* to connect the subtractor 205 to the transform unit 216, controls the switch 204*b* to connect the compensation unit 215 to the subtractor 205, and controls the switch 204*c* to connect the compensation unit 215 to the adder 221.

Next, the block size determination unit 210*b* determines a block size for disparity detection based on blur values of the coding target image (Step S64*c*). Firstly, the block size determination unit 210*b* acquires a blur value of each of coding target regions of the coding target image from the blur processing unit 202, and compares the acquired blur value with the threshold value (Step S221). If judging that the blur value is higher than the threshold value, the block size determination unit 210*b* outputs, to the block division unit 212*b*, block size information indicating the limitation of the block size of the block unit to be used for disparity vector detection by the detection unit 214 to 16×16, which is a large block size (Step S222).

On the contrary, if judging that the blur value is equal to or lower than the threshold value, the block size determination unit 210*b* outputs, to the block division unit 212*b*, block size information indicating 8×8, which is a small block size, in addition to the block size of 16×16 (Step S223).

The block division unit 212*b* divides the coding target image output by the selector 203 into blocks each having a block size indicated by the block size information output by the block size determination unit 210*b* (Step S65*c*).

The detection unit 214 searches for a block that is the same as or similar to each of blocks of the coding target image, with use of the block size received by the block division unit 212*b* to detect a disparity vector. Then, the detection unit 214 outputs, to the compensation unit 215, a disparity vector of each block with use of the most similar block (Step S663).

If receiving block information indicating the limitation to the block size of 16×16 from the block division unit 212*b*, the detection unit 214 searches for a block for disparity vector detection that is the same as or similar to each block included in a region of 32×32 pixels surrounding the coding target block with use of only the block size of 16×16.

Compared with this, if receiving block size information indicating two types of block sizes of 16×16 and 8×8, the detection unit 214 searches for a block that is the same as or similar to each block included in a region of 32×32 pixels surrounding the coding target block with use of the two types of block sizes of 16×16 and 8×8. Then, the detection unit 214 outputs, to the compensation unit 215, a disparity vector of each block with use of the most similar block.

Furthermore, the compensation unit 215 performs disparity compensation with use of the detected disparity vector to generate a prediction signal of each block of the coding target image (Step S664).

Also, the subtractor 205 subtracts an image contained in the prediction signal from the coding target image to generate a prediction residual signal (Step S67*c*).

Next, the switch 204*a* outputs the generated prediction residual signal to the transform unit 216 (Step S70).

Here, there is a case where a plurality of prediction residual signals are generated. In the case where a coding target image is a sub image and is a P-picture for example, three prediction residual signals are generated. Namely, because of being a sub image, a prediction residual signal results from disparity compensation (Step S67*c*). Also, because of being a P-picture, a prediction residual signal results from motion compensation (Step S67*c*). Furthermore, because intra coding is available, a prediction residual signal results from intra coding (Step S67*a*). In the above case, the switch 204*a* transfers the smallest prediction residual signal among the generated plurality of prediction residual signals from the subtractor 205 to the transform unit 216.

On the contrary, there is a case where no prediction residual signal is generated. In the case where a coding target image is a main image and is an I-picture for example, no prediction residual signal is generated because none of intra prediction, motion compensated prediction, and disparity compensated prediction is performed. In such a case, the switch 204*a* does not select a prediction residual signal, and outputs, to the transform unit 216, coding target blocks of main image data output by the selector 203.

Then, the transform unit 216 performs orthogonal transform on the prediction residual signal or each of the coding target blocks output by the switch 204*a* to generate a frequency coefficient (Step S80).

The quantization unit 217 quantizes the frequency coefficient to generate a quantization value (Step S90). The variable-length coding unit 218 performs variable-length coding on the quantization value (Step S100).

<Summary>

According to the present embodiment as described above, it is possible to determine a block size for coding depending on an arbitrary blur degree with use of blur information added by blur processing performed based on an arbitrary blur parameter, in addition to distance information based on disparity information and focus point information.

With the above structure of the coding method according to which a block size is determined from among a plurality candidates, a block size to be used is limited to a larger block size with respect to a region having a higher blur value. Accordingly, it is possible to improve the compression rate of a region having a small information amount and a high blur amount.

Also, according to the present embodiment, it is possible to perform intra prediction coding after determination of a variable block size depending on an arbitrary blur degree.

According to intra prediction coding that improves the compression rate with use of the correlation between blocks in an image, a region set to have a high blur value is judged to a smooth image whose high-frequency components have been decreased due to strong blur processing, and prediction is performed without using the smallest prediction block size. Accordingly, prediction with use of a large block size reduces processing amount for searching for a reference block having a small prediction residual signal resulting from intra prediction, thereby achieving the speed-up of processing, reduction in energy consumption, and so on. On the contrary, with respect to a region having a low blur value or a region to which no blur is added, prediction is performed with use of block sizes including a small block size in case of existence of a complicated image. As a result, it is possible to perform efficient prediction on both a smooth image and a complicated image.

Also, according to the present embodiment, it is possible to perform inter prediction coding by motion compensated prediction or disparity compensated prediction after determination of a variable block size depending on an arbitrary blur degree.

According to inter prediction coding that improves the compression rate with use of the block correlation between a plurality of images, a region having a high blur value is judged to a smooth image whose high-frequency components have decreased due to strong blur processing. Accordingly, prediction with use of a large block size reduces processing amount for reference block searching to have a small prediction residual signal resulting from inter prediction. This achieves the speed-up of processing, reduction in energy consumption, and so on. On the contrary, with respect to a region having a low blur value or a region to which no blur is added, prediction is performed with use of block sizes including a small block size in case of existence of a complicated image. As a result, it is possible to perform efficient prediction on both a smooth image and a complicated image. Furthermore, the image coding device performs inter prediction by storing a plurality of images in a memory and referring to the stored images for reference block searching. Accordingly, limitation to prediction by only in units of blocks of a large block size reduces the number of accesses to data or data transfer amount, thereby reducing the memory bandwidth.

Modification Example 1

In the above embodiment, the image coding device 200 generates disparity information with use of a main image and a sub image, adds blur to each of the main image and the sub image, and then codes each of the blurred main image and the blurred sub image. Alternatively, the following structure may be employed where a single image is acquired, distance information of the single image is acquired for each pixel unit, blur is added to the image, and then the blurred image is coded.

Figure 9:
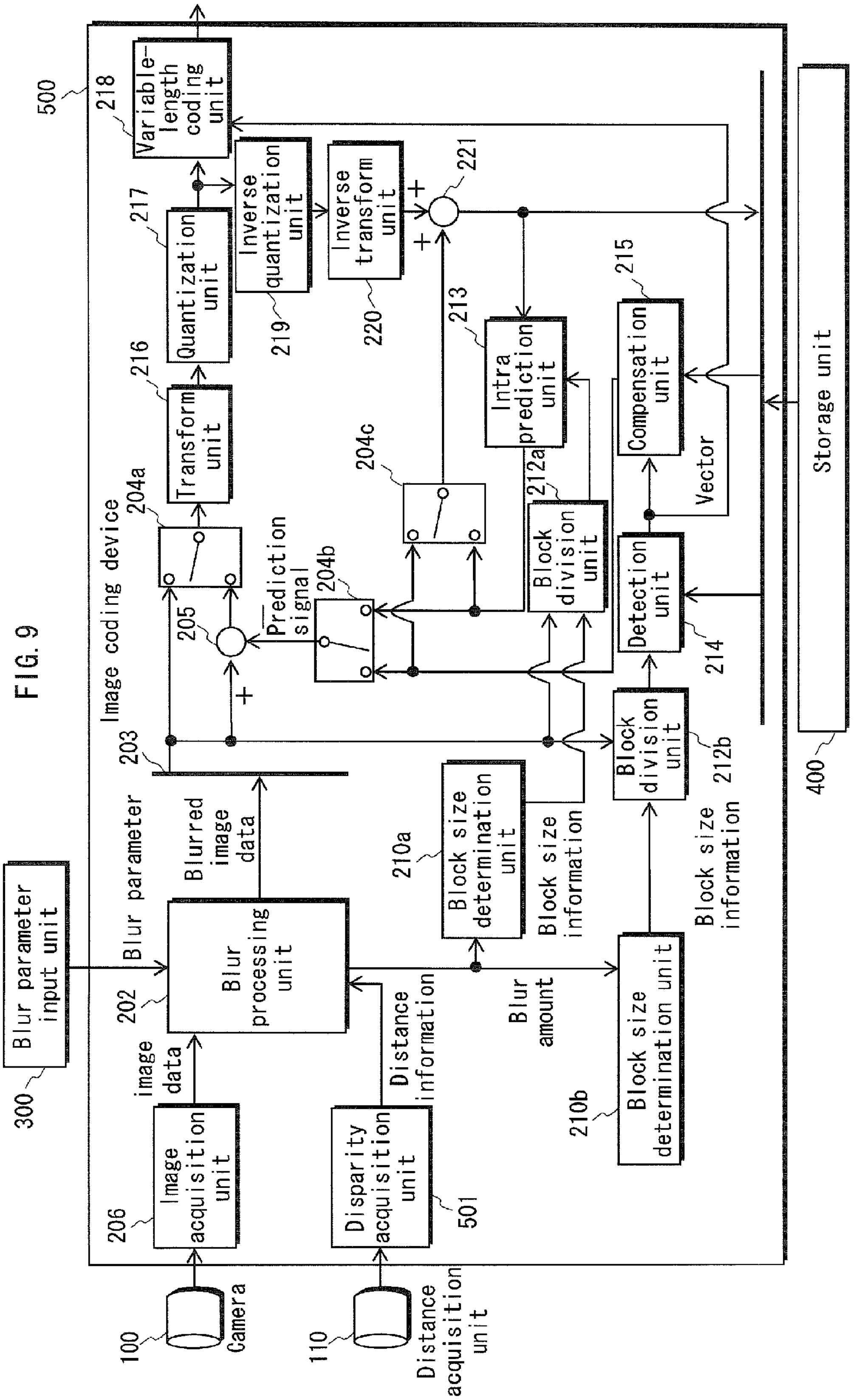
FIG. 9 is a block diagram showing an image coding device relating to Modification Example 1 of Embodiment 1 of the present invention.

FIG. 9 shows an image coding device 500 relating to the present modification example. Components shown in FIG. 9 that are the same as the components shown in FIG. 1 have the same numeral references, and description thereof is omitted.

A photograph image coding system shown in FIG. 9 simultaneously photographs a subject and acquires distance information indicating a distance between the subject and the photograph image coding system, and then codes image signals to which blur has been added with use of the distance information. This photograph image coding system includes the image coding device 500 relating to the present modification example, a camera 100, a distance acquisition unit 110, and a blur parameter input unit 300.

<Distance Acquisition Unit 110>

The distance acquisition unit 110 measures, for each pixel, a distance between the camera 100 and a subject included in an image output by the camera 100. The distance acquisition unit 110 measures the distance by transmitting ultrasonic waves, millimeter waves, or the like to the subject, and measuring a time period till when a reflected wave from the subject reaches the distance acquisition unit 110, the phase difference, or the like.

<Image Coding Device 500>

The image coding device 500 adds blur to image signals output by the camera 100 with use of the distance information output by the distance acquisition unit 110, and codes the blurred image signals to generate and output coded image signals.

The image coding device 500 includes an image acquisition unit 206, a disparity acquisition unit 501, a blur processing unit 202, a selector 203, switches 204*a*, 204*b*, and 204*c*, a subtractor 205, block size determination units 210*a* and 210*b*, block division units 212*a* and 212*b*, an intra prediction unit 213, a detection unit 214, a compensation unit 215, a transform unit 216, a quantization unit 217, a variable-length coding unit 218, an inverse quantization unit 219, an inverse transform unit 220, and an adder 221.

<Disparity Acquisition Unit 501>

The disparity acquisition unit 501 does not include a disparity detection subunit 201. The disparity acquisition unit 501 acquires disparity information or distance information from the distance acquisition unit 110, and outputs the acquired disparity information or distance information to the blur processing unit 202. In the present modification example, the disparity acquisition unit 501 acquires, from the distance acquisition unit 110, a distance between the camera 100 and a subject included in an image output by the camera 100 for each pixel unit.

<Operations>

The image coding device 500 performs operations that are the same as those described in the above embodiment, except that a blur value is calculated with use of input distance information with no disparity detection and a target for blur addition and coding is a single image. Accordingly, the following describes the difference with reference to the flowchart shown in FIG. 4.

The image acquisition unit 206 acquires, from the camera 100, image signals that are single-viewpoint video signals (Step S20).

The disparity acquisition unit 501 acquires distance information of the image signal for each pixel unit from the distance acquisition unit 110, and outputs the acquired distance information to the blur processing unit 202 (Step S30).

The image coding device 500 selects the image signals acquired by the image acquisition unit 206 as a coding target image (Step S40).

The blur processing unit 202 calculates a blur value with use of distance information of the image signals for each pixel unit, and adds blur to the coding target image (Step S50). Here, the blur processing unit 202 has already acquired the distance information from the disparity acquisition unit 501. Accordingly, the blur processing unit 202 does not perform processing of calculating distance information based on disparity information with use of a blur parameter, and calculates a blur value with use of the distance information acquired from the disparity acquisition unit 501.

Operations of coding processing described below are the same as the operations of Steps S60 to S100, except that there exists no sub image and a single image is coded. Accordingly, description on the same operations is omitted here.

According to the present modification example as described above, in the case where distance information of a subject included in a single image has been already acquired, it is possible to select a block size with use of blur information added by blur processing performed with use of an arbitrary blur parameter and the distance information, to code the single image.

In the present modification example, the disparity acquisition unit 501 acquires distance information from the distance acquisition unit 110, and outputs the acquired distance information to the blur processing unit 202. Alternatively, the disparity acquisition unit 501 may receive input of disparity information such as a disparity image. In this case, the disparity acquisition unit 501 may output the acquired disparity information to the blur processing unit 202, or may transform the disparity information to distance information with use of a blur parameter and output the distance information to the blur processing unit 202. Alternatively, in the similar manner, the disparity acquisition unit 501 may acquire distance information, transform the distance information to a disparity information, and output the disparity information to the blur processing unit 202.

Modification Example 2

The image coding device 200 relating to the above embodiment adds blur to stereoscopic video signals, which are composed of a main image and a sub image, and codes the blurred stereoscopic video signals. Alternatively, blur may be added to only one of the main image and the sub image, and the only one blurred image may be coded.

In this case, the image coding device 200 may include, for example, in a blur parameter, information indicating whether blur is to be added to the main image or the sub image, and select a coding target image based on the information in S40. This enables performance of blur processing and coding processing on only a coding target image. Alternatively, in the case where blur is to be added to only the main image for coding, the camera 100*b* may output image signals to only the disparity detection subunit 201, without outputting to the image acquisition unit 206 or the blur processing unit 202.

In the present modification example, the number of target images for blur addition and coding is one, and accordingly the blur processing unit 202 performs blur processing on only a coding target image, and outputs a single piece of blurred image data resulting from the blur processing to the selector 203. The blur processing and coding are the same as those relating to the above modification example 1, and accordingly description thereof is omitted here.

Embodiment 2

Figure 10:
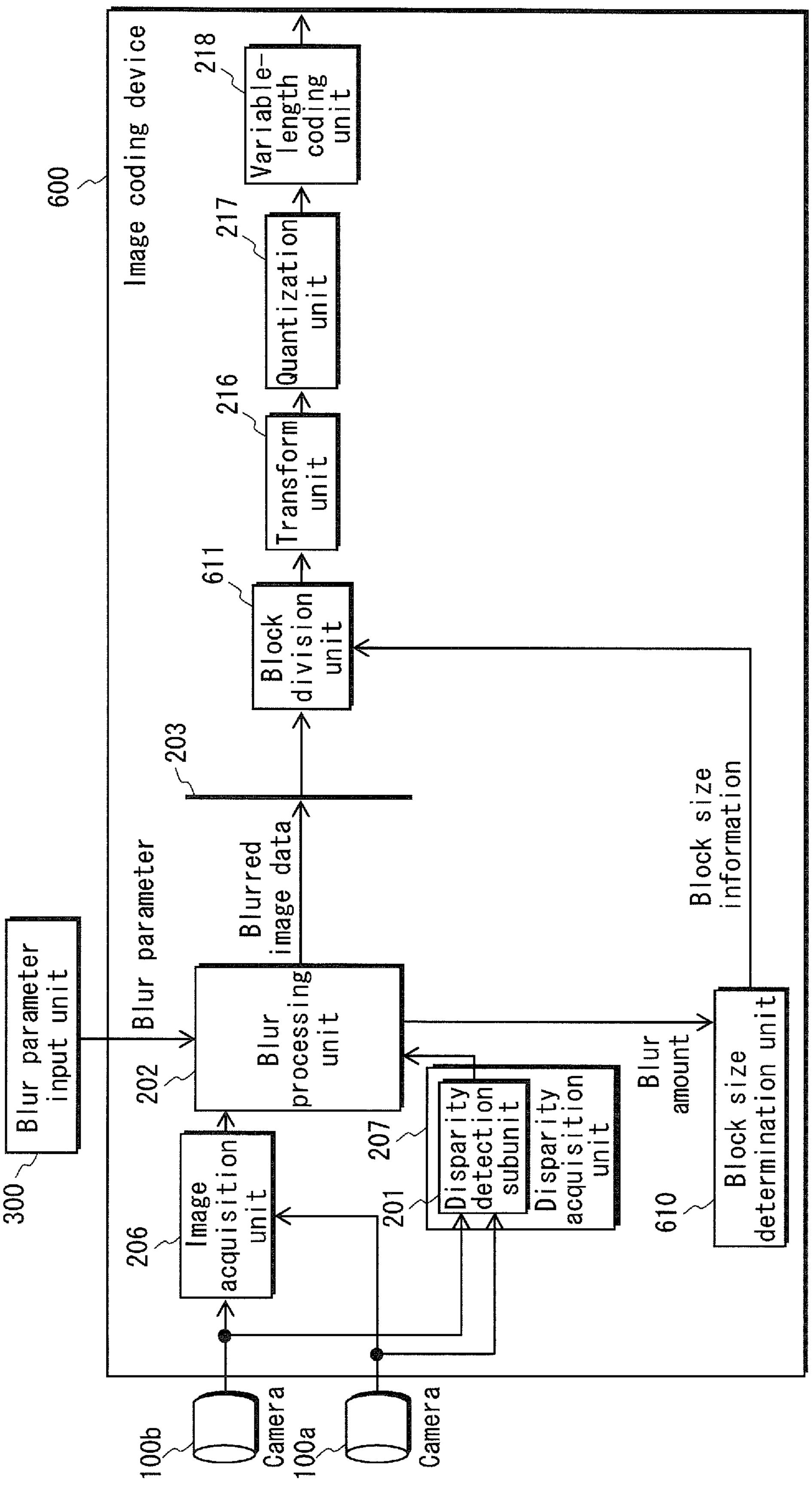
FIG. 10 is a block diagram showing an image coding device relating to Embodiment 2 of the present invention.

FIG. 10 is a block diagram showing an image coding device 600 relating to Embodiment 2 of the present invention. Components shown in FIG. 10 that are the same as the components shown in FIG. 1 have the same numeral references, and description thereof is omitted.

The image coding device 600 relating to the present embodiment is characterized in performing coding with use of orthogonal transform of transforming into frequency components after determining a variable block size depending on an arbitrary blur degree.

A stereoscopic photograph coding system shown in FIG. 10 photographs a subject so as to be stereoscopically viewed, and codes stereoscopic video signals resulting from the photographing. This stereoscopic photograph coding system includes the image coding device 600 relating to Embodiment 2, cameras 100*a* and 100*b* for photographing a main image and a sub image that have a disparity therebetween, respectively, and a blur parameter input unit 300.

<Image Coding Device 600>

With use of disparity information output by the disparity detection subunit 201, the image coding device 600 adds blur to stereoscopic video signals output by the cameras 100*a* and 100*b*, and codes the blurred stereoscopic video signals to generate and output coded video signals. Also, in the case where two video signals contained in the stereoscopic video signals are to be coded, the image coding device 600 codes each of the video signals as a static image or a moving image.

The image coding device 600 includes an image acquisition unit 206, a disparity acquisition unit 207, a blur processing unit 202, a selector 203, a block size determination unit 610, a block division unit 611, a transform unit 216, a quantization unit 217, and a variable-length coding unit 218.

In the present embodiment, as the coding method, the JPEG 2000 standard for still images and the motion JPEG 2000 standard for video images are used that adopt DWT (Discrete Wavelet Transform) that is one type of orthogonal transform.

<Block Size Determination Unit 610>

The block size determination unit 610 acquires a blur value for each of coding target regions of a coding target image from the blur processing unit 202, and compares the acquired the blur value with a threshold value.

In the present embodiment, one of the two block sizes of 16×16 and 8×8 is used, and the threshold value is determined to eight pixels.

If the blur value is higher than the threshold value, the block size determination unit 610 outputs, to the block division unit 611, block size information indicating the limitation of the block size of the block unit to be used for orthogonal transform by the transform unit 216 to 16×16, which is a large block size.

On the contrary, if the blur value is equal to or lower than the threshold value, the block size determination unit 610 outputs, to the block division unit 611, block size information indicating the limitation to 8×8, which is a small block size.

<Block Division Unit 611>

The block division unit 611 divides the coding target image output by the selector 203 into blocks each having a block size indicated by the block size information output by the block size determination unit 610.

In the present embodiment, if the block size information indicates the limitation to 16×16, the block division unit 611 divides the coding target image into blocks each having the block size of 16×16, and outputs the image, which has been divided into the blocks, to the transform unit 216.

Compared with this, if the block size information indicates the limitation to 8×8, the block division unit 611 divides the coding target image into blocks each having the block size of 8×8, and outputs the image, which has been divided into the blocks, to the transform unit 216.

<Operations>

Figure 11:
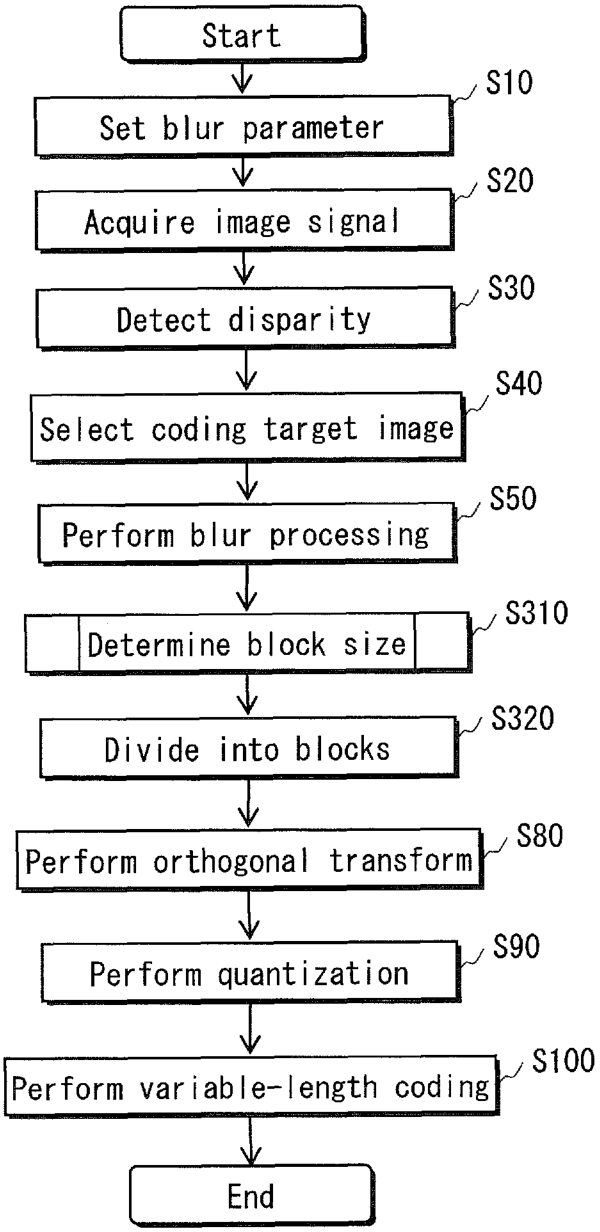
FIG. 11 is a flowchart showing operations by the image coding device relating to Embodiment 2 of the present invention.
Figure 12:
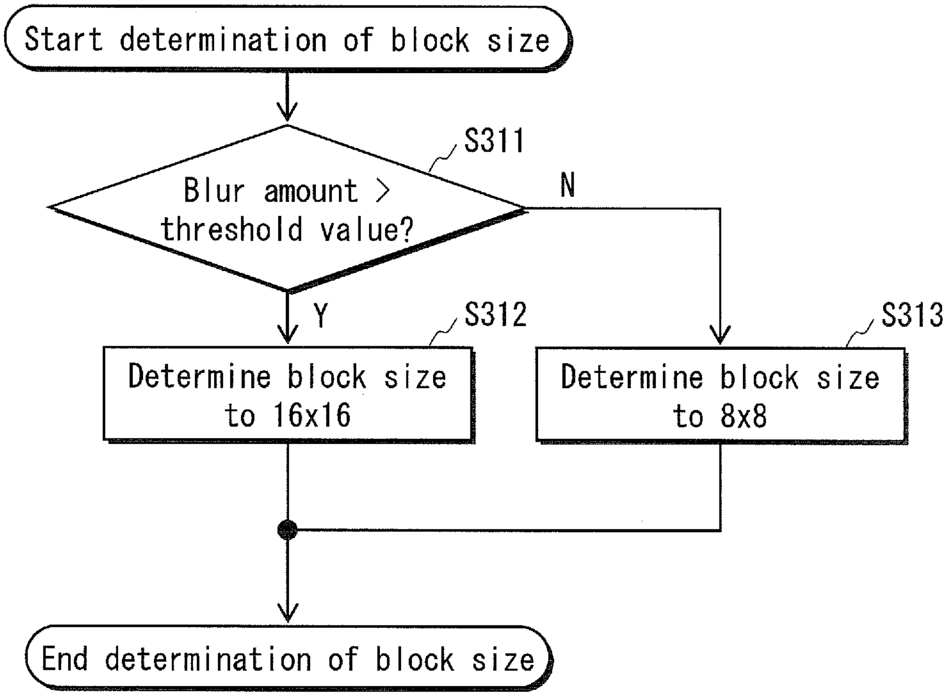
FIG. 12 is a flowchart showing operations of determining the block size by the image coding device relating to Embodiment 2 of the present invention.

FIG. 11 and FIG. 12 are each a flowchart showing operations by the image coding device 600 relating to the present embodiment.

Figure 4:
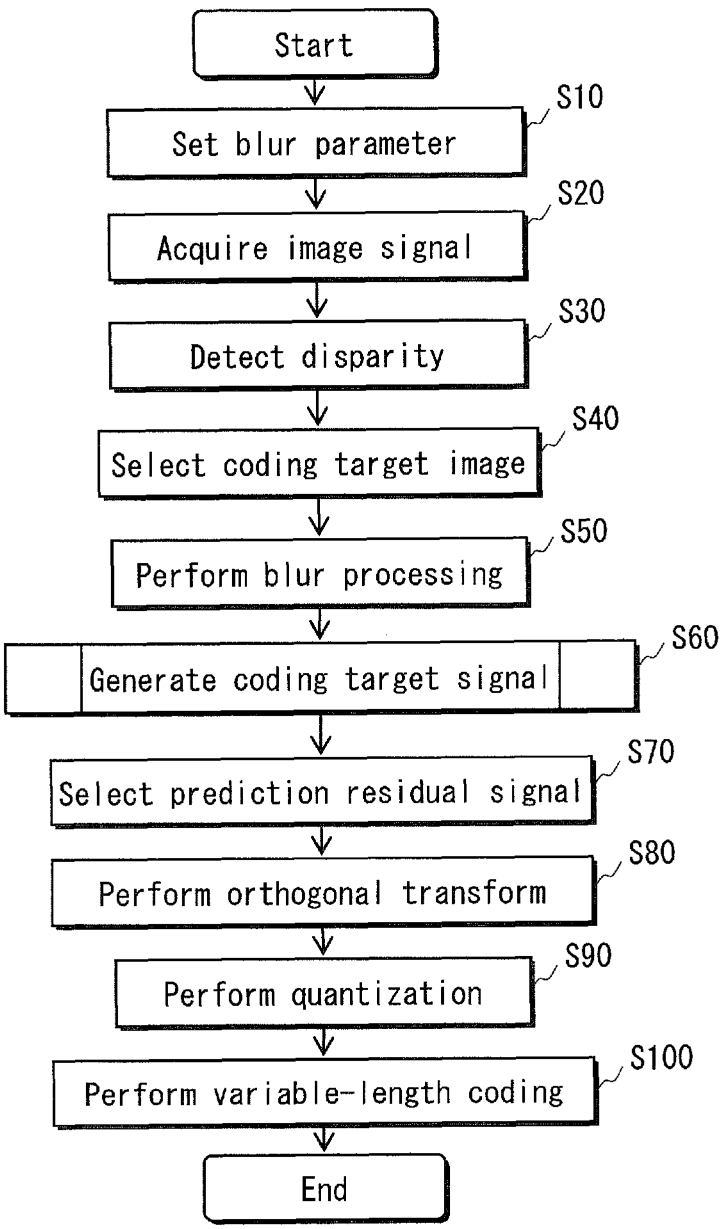
FIG. 4 is a flowchart showing operations by the image coding device relating to Embodiment 1 of the present invention.
Figure 5:
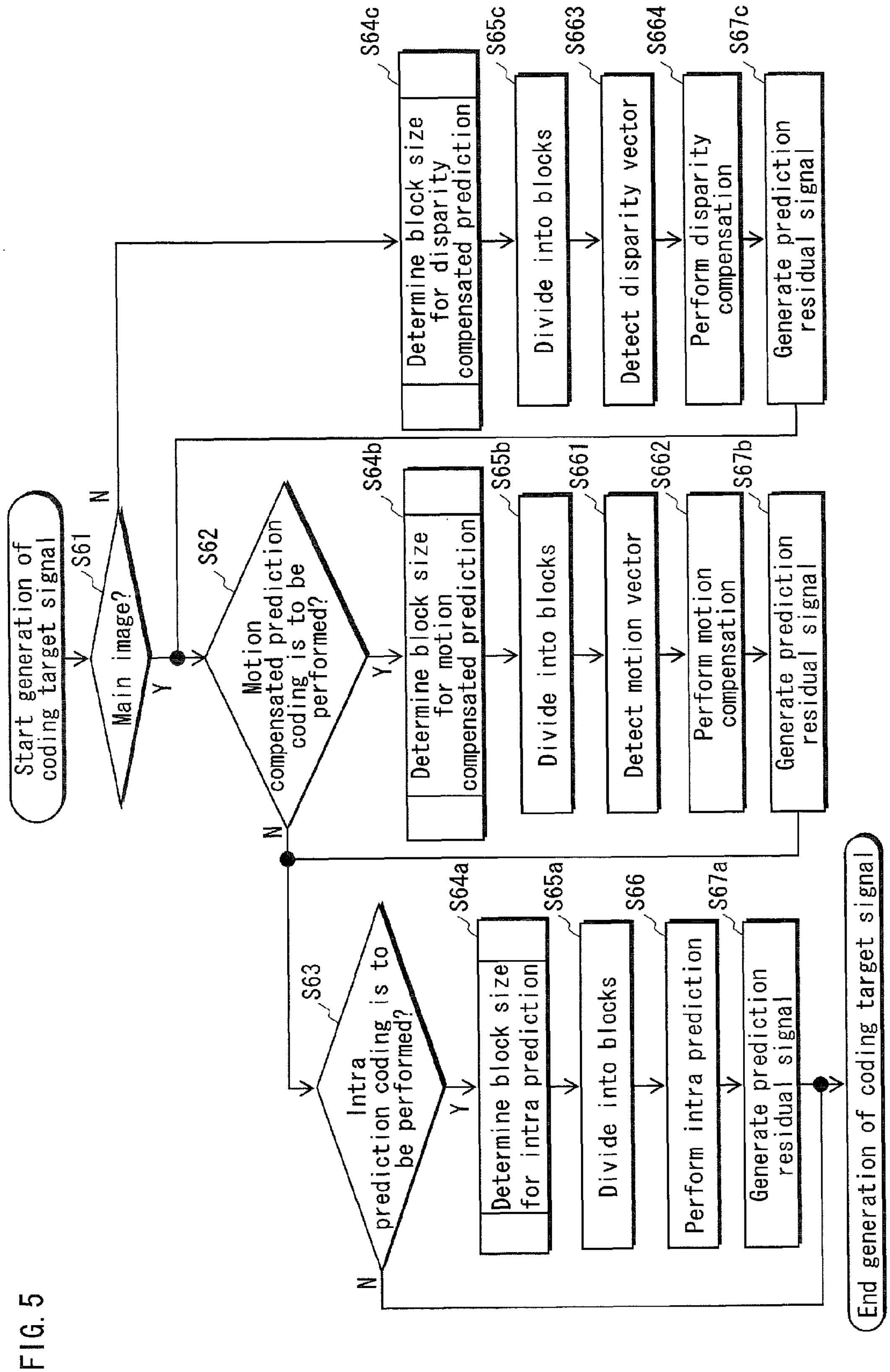
FIG. 5 is a flowchart showing operations for generating a coding target signal by the image coding device relating to Embodiment 1 of the present invention.
Figure 6:
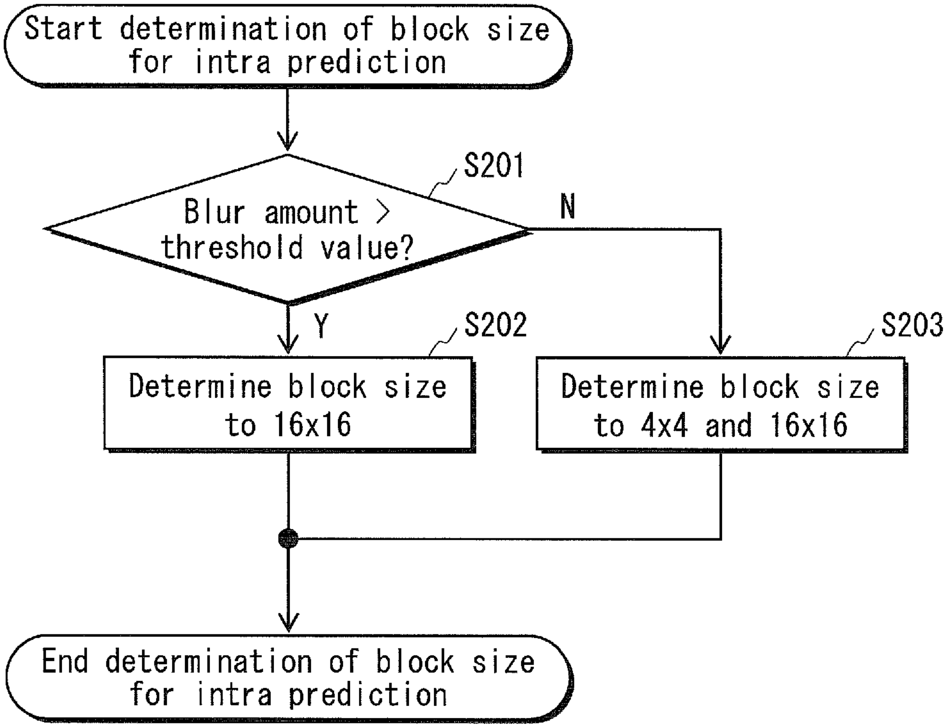
FIG. 6 is a flowchart showing operations of determining a block size for infra prediction by the image coding device relating to Embodiment 1 of the present invention.
Figure 7:
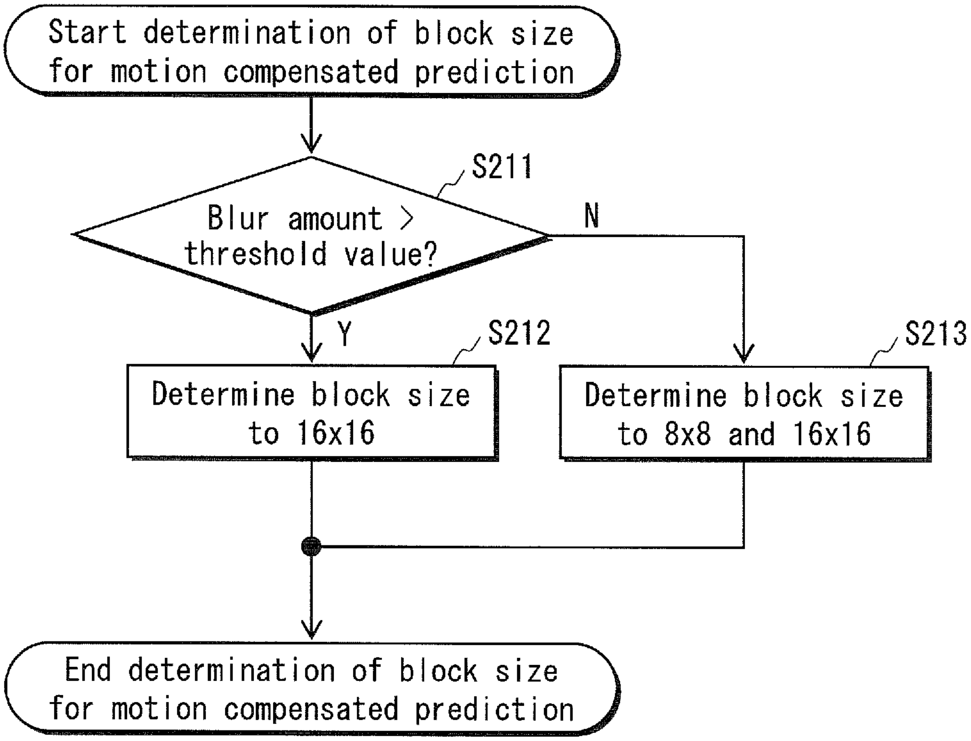
FIG. 7 is a flowchart showing operations of determining the block size for motion compensated prediction by the image coding device relating to Embodiment 1 of the present invention.
Figure 8:
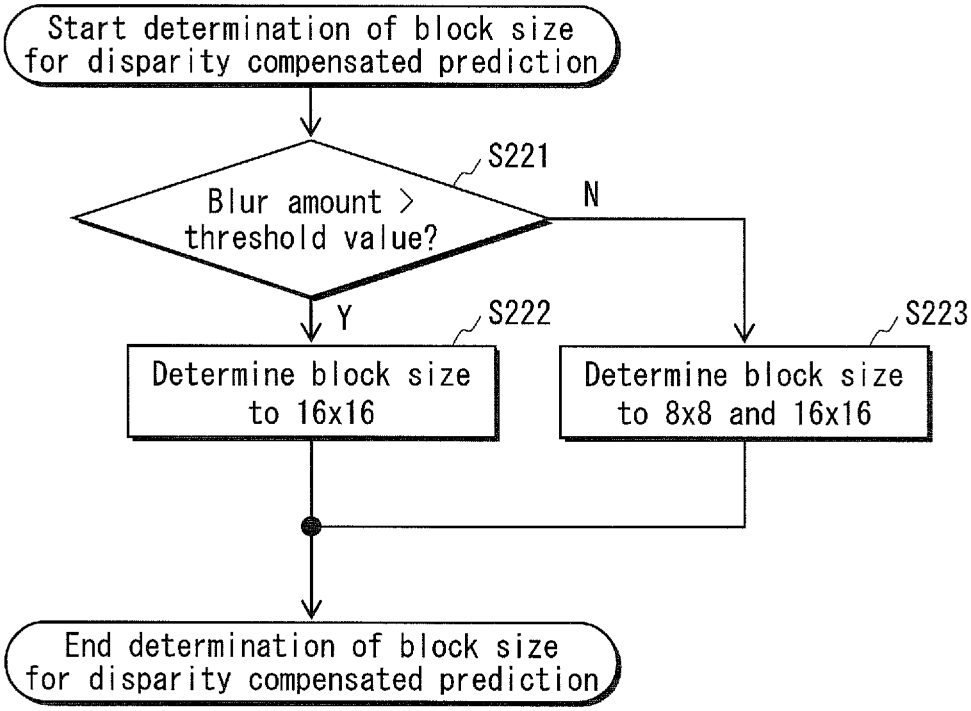
FIG. 8 is a flowchart showing operations of determining the block size for disparity compensated prediction by the image coding device relating to Embodiment 1 of the present invention.

The operations shown in FIG. 11 that are the same as the operations shown in FIG. 4 have the same step numbers, and description thereof is omitted.

The block size determination unit 610 determines a block size for orthogonal transform based on blur values of the coding target image (Step S310). Firstly, the block size determination unit 610 acquires a blur value of each of coding target regions of the coding target image from the blur processing unit 202, and compares the acquired blur value with the threshold value (Step S311). If judging that the blur value is higher than the threshold value, the block size determination unit 610 outputs, to the block division unit 611, block size information indicating the limitation of the block size of the block unit to be used for orthogonal transform by the transform unit 216 to 16×16, which is a large block size (Step S312).

On the contrary, if judging that the blur value is equal to or lower than the threshold value, the block size determination unit 610 outputs, to the block division unit 611, block size information indicating the limitation to 8×8, which is a small block size (Step S313).

The block division unit 611 divides the coding target image output by the selector 203 into blocks each having a block size indicated by the block size information output by the block size determination unit 610 (Step S320).

<Summary>

According to the present embodiment as described above, block size for orthogonal transform in coding processing is determined based on blur information added by blur processing performed with use of an arbitrary blur parameter. This enables determination of block size for orthogonal transform depending on an arbitrary blur degree.

Also, in a region having a high blur value, high-frequency components decrease due to strong blur processing. Accordingly, the increase in block size that is limited to large achieves high compression.

Note that the modification described in Modification Example 1 or 2 of Embodiment 1 may be applicable to the image coding device 600 relating to Embodiment 2. The operations in Modification Example 1 or 2 are the same as those in Embodiment 2, except that there exists the difference in Steps S10 to S40 described in the modification examples of Embodiment 1 and a target for blur addition and coding is a single image signal.

Embodiment 3

Figure 13:
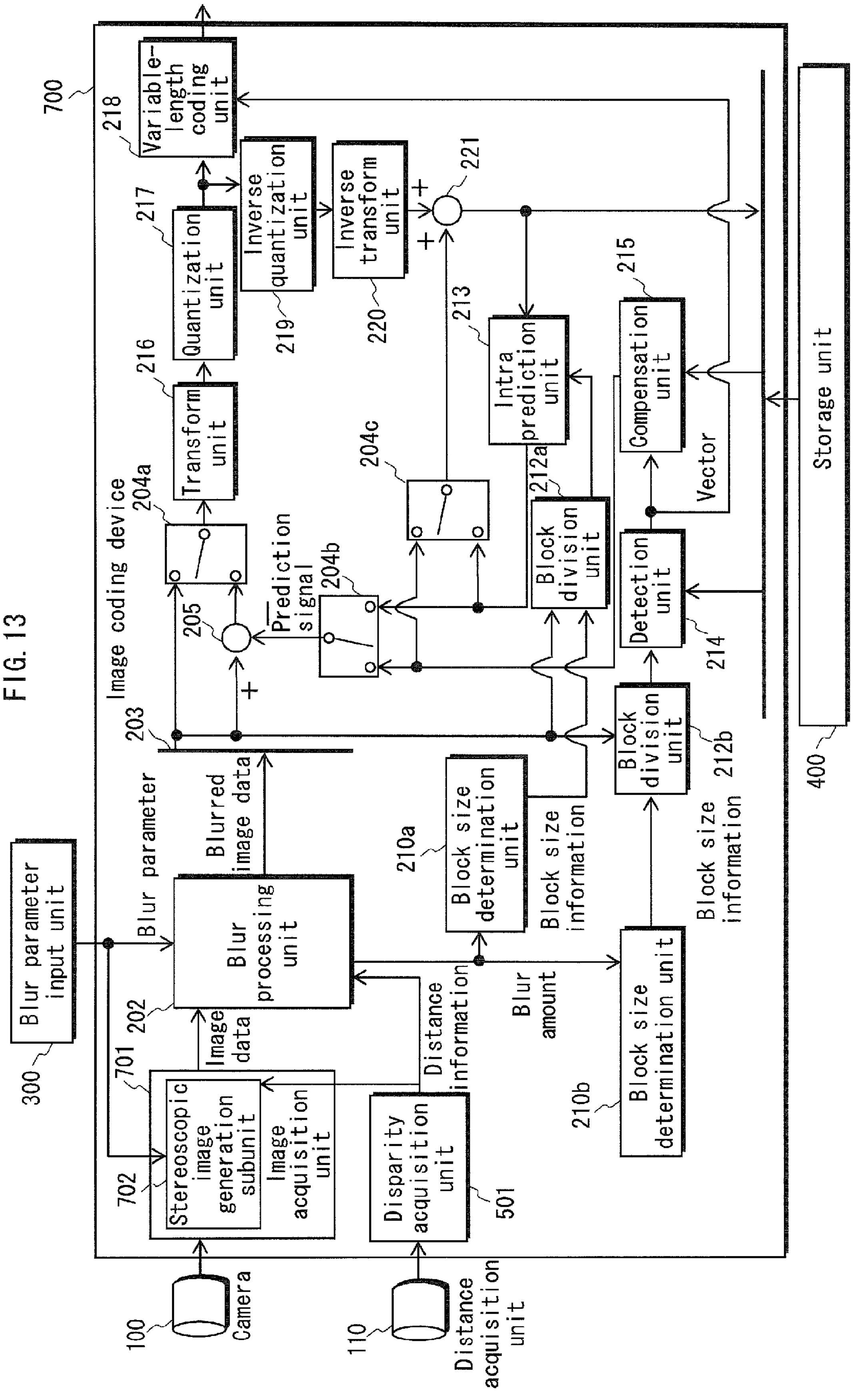
FIG. 13 is a block diagram showing an image coding device relating to Embodiment 3 of the present invention.

FIG. 13 is a block diagram showing an image coding device 700 relating to Embodiment 3 of the present invention. Components shown in FIG. 13 that are the same as the components shown in FIG. 1 and FIG. 9 have the same numeral references, and description thereof is omitted.

The image coding device 700 relating to the present embodiment is characterized in generating two stereoscopically-viewable images based on one image and distance information of a subject included in the image, adding arbitrary blur to the generated images with use of the distance information of the subject, and coding the blurred images.

A stereoscopic video coding system shown in FIG. 13 simultaneously photographs a subject and acquires distance information of the subject, generates stereoscopic video signals with use of an image generated based on the distance information, and codes the generated stereoscopic video signals. This stereoscopic video coding system includes the image coding device 700 relating to Embodiment 3, a camera 100 for receiving input of an image, an distance acquisition unit 110, a blur parameter input unit 300, and a storage unit 400.

<Image Coding Device 700>

The image coding device 700 includes a disparity acquisition unit 501, an image acquisition unit 701, a blur processing unit 202, a selector 203, switches 204*a*, 204*b*, and 204*c*, a subtractor 205, block size determination units 210*a* and 210*b*, block division units 212*a* and 212*b*, an intra prediction unit 213, a detection unit 214, a compensation unit 215, a transform unit 216, a quantization unit 217, a variable-length coding unit 218, an inverse quantization unit 219, an inverse transform unit 220, and an adder 221. Also, the image acquisition unit 701 includes a stereoscopic image generation subunit 702.

<Blur Parameter Input Unit 300>

The blur parameter input unit 300 is a user interface for receiving input of a stereoscopic image generation parameter and a blur parameter. The stereoscopic image generation parameter is for generating a stereoscopic image with use of an image photographed by the camera 100. The blur parameter is for adding blur to generated stereoscopic video signals.

A parameter to be input is described below. The blur parameter input unit 300 receives input of, as the stereoscopic image generation parameter, a base-line length l between two cameras assumed to be used for stereoscopic image photographing, an adjustment value of disparity $S_r$, and a weighting coefficient $W_r$, in addition to the pixel size m and the focal distance $f_p$ of the camera 100. The blur parameter input unit 300 receives input, as the blur parameter, one, both, or none of respective adjustment values of blur $S_n$ and $S_f$ in points forward and backward a subject, one, both, or none of respective weighting coefficients $W_n$ and $W_f$ forward and backward the subject, focus point information P of the subject, and lens information that differs from lens information of an actual photographic lens, namely, a virtual focal distance $f_v$ and a virtual aperture value (F-number).

Note that the adjustment value of blur $S_r$ and the weighting coefficient $W_r$ are each a coefficient for varying the distance between the camera and each of a plurality of subjects, and the difference in distance between the subjects. These coefficients exhibit the following effects. As these coefficients each increase, a value indicated by distance information obtained from disparity information of each of the subjects decreases, and also the difference in distance from the camera between the subjects decreases. As these coefficients each decrease, the value indicated by the distance information obtained from the disparity information of each subject increases, and also the difference in distance from the camera between the subjects increases. Also, in the case where the adjustment amount of disparity $S_r$ is set to zero and the weighting coefficient $W_r$ is set to one, a sub image is generated which is assumed to have been photographed at a position distant from the camera 100 by the base-line length l.

The blur parameter input unit 300 receives the set parameters, and outputs the stereoscopic image generation parameter and the blur parameter to the stereoscopic image generation unit 701 and the blur processing unit 202, respectively.

<Image Acquisition Unit 701>

The image acquisition unit 701 acquires an image from the camera 100, generates stereoscopic video signals, and outputs the generated stereoscopic video signals to the blur processing unit 202. The image acquisition unit 701 includes a stereoscopic image generation subunit 702 that generates stereoscopic video signals.

<Stereoscopic Image Generation Subunit 702>

The stereoscopic image generation subunit 702 generates stereoscopic video signals composed of a left-view image and a right-view image, with use of an image output by the camera 100 and distance information output by the disparity acquisition unit 501.

The following describes a method of generating a stereoscopic image. As described in Embodiment 1, a distance D between a subject and the camera is calculated by Equation 2 (FIG. 2A), where disparity information is represented as d.

$$d = \frac{f_p \cdot 1}{m \cdot D} \qquad \text{[Equation 4]}$$

The stereoscopic image generation subunit 702 performs the above calculation with respect to each of all subjects included in a stereoscopic image to obtain a disparity value of each of the subjects.

In the present embodiment, the stereoscopic image generation subunit 702 uses, as a main image, an image acquired by the image acquisition unit 701 from the camera 100 with no modification, and moves each pixel of the main image by $d_r$ that results from calculation by the following Equation 5 to generate a sub image.

$$d_r = W_r \cdot d + S_r \qquad \text{[Equation 5]}$$

Note that, depending on the distribution of the value $d_r$, there is a case where each pixel of the sub image corresponds to a plurality of pixels of the main image or there is a case where a certain pixel of the sub image corresponds to no pixel of the main image. In the case where each pixel of the sub image corresponds to a plurality of pixels of the main image, it is possible to make the sub image to be natural by corresponding each pixel of the sub image to one of the plurality of pixels of the main image that is the closest to the camera. On the contrary, in the case where a certain pixel of the sub image corresponds to no pixel of the main image, that is, in the case where the certain pixel of the sub image is a blank pixel, it is possible to prevent output of the sub image that is unnatural by duplicating data of a pixel adjacent to the blank pixel to fill the blank pixel.

The stereoscopic image generation subunit 702 outputs the generated main image and sub image to the blur processing unit 202.

<Operations>

Figure 14:
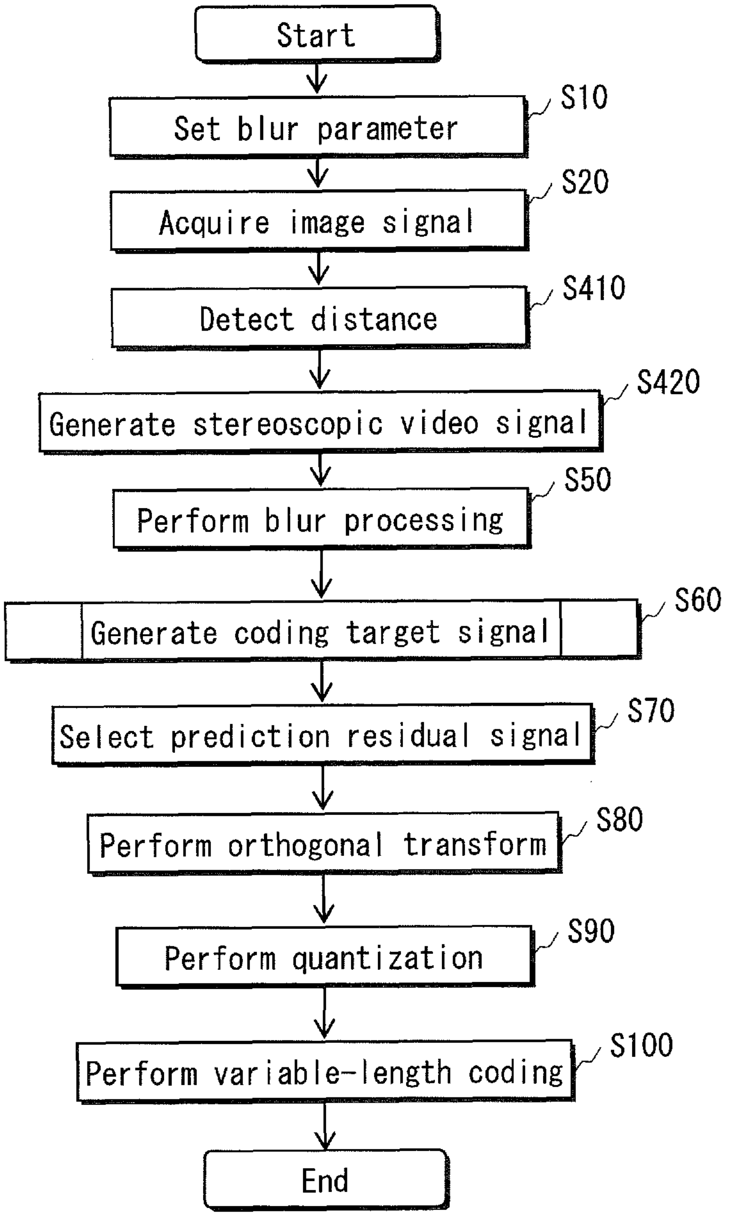
FIG. 14 is a flowchart showing operations by the image coding device relating to Embodiment 3 of the present invention.

FIG. 14 is a flowchart showing operations by the image coding device 700 relating to the present embodiment.

The operations shown in FIG. 14 that are the same as the operations shown in FIG. 4 have the same step numbers, and description thereof is omitted.

After completing the settings of the blur parameter, the image coding device 700 acquires image signals (Step S20), and acquires distance information of an image contained in the acquired image signals for each pixel unit (Step S410).

The stereoscopic image generation subunit 702 calculates a disparity value that stereoscopic video signals should have, based on the blur parameter acquired in Step S10 and the distance information acquired in Step S410. The stereoscopic image generation subunit 702 generates a stereoscopic image, by using the image acquired in Step S20 as a main image and adding the calculated disparity value to the main image to generate a sub image (Step S420). The stereoscopic image generation subunit 702 outputs the generated stereoscopic image to the blur processing unit 202.

The image coding device 700 relating to the present embodiment generates two stereoscopically-viewable images based on one image and distance information of a subject included in the image, adds arbitrary blur to the generated images with use of the distance information of the subject, and codes the blurred images. This enables generation of coded stereoscopic video signal to which blur is added, with use of a single-viewpoint image and distance information of a subject included in the single-viewpoint image.

Embodiment 4

Figure 15:
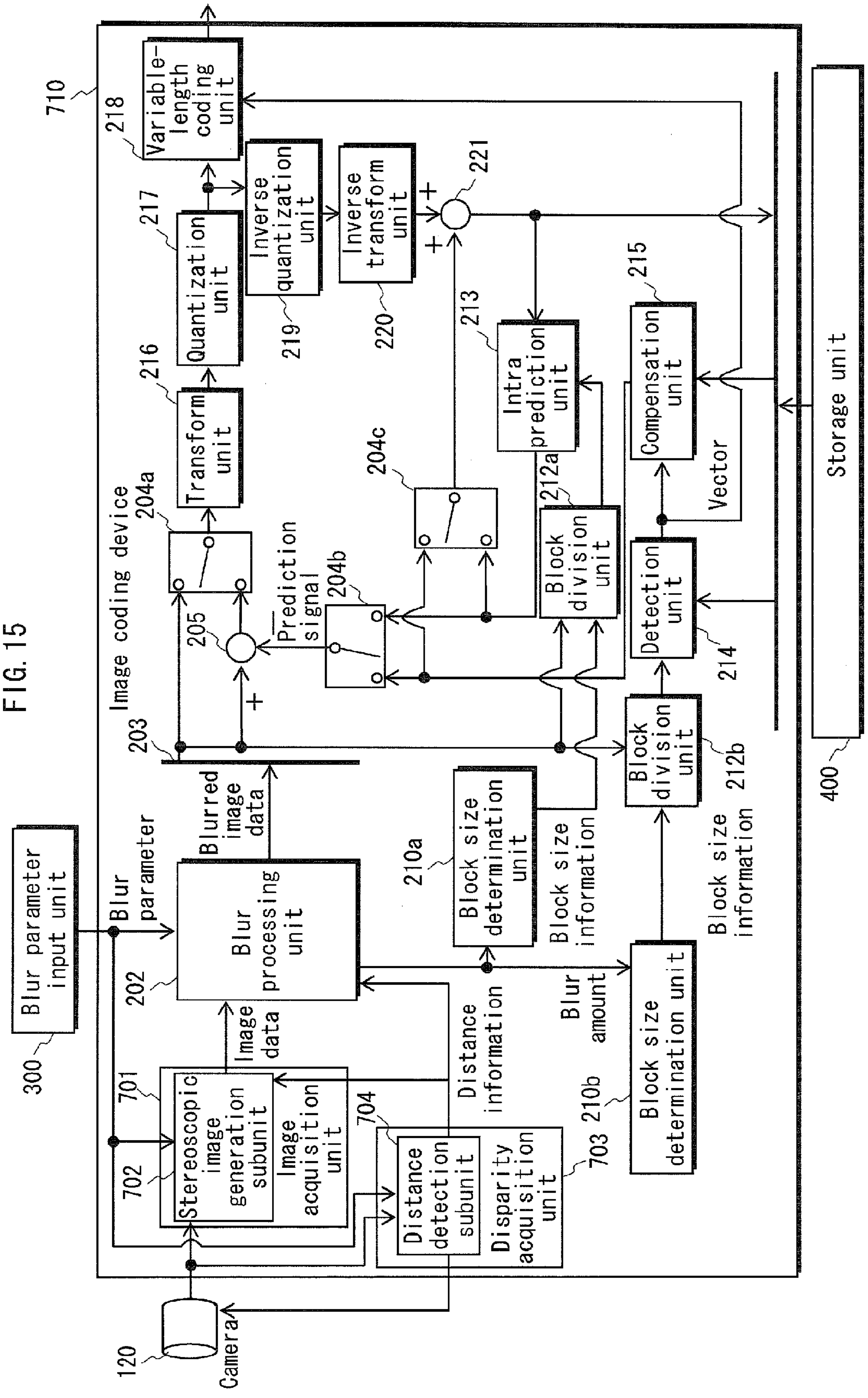
FIG. 15 is a block diagram showing an image coding device relating to Embodiment 4 of the present invention.
Figure 16:
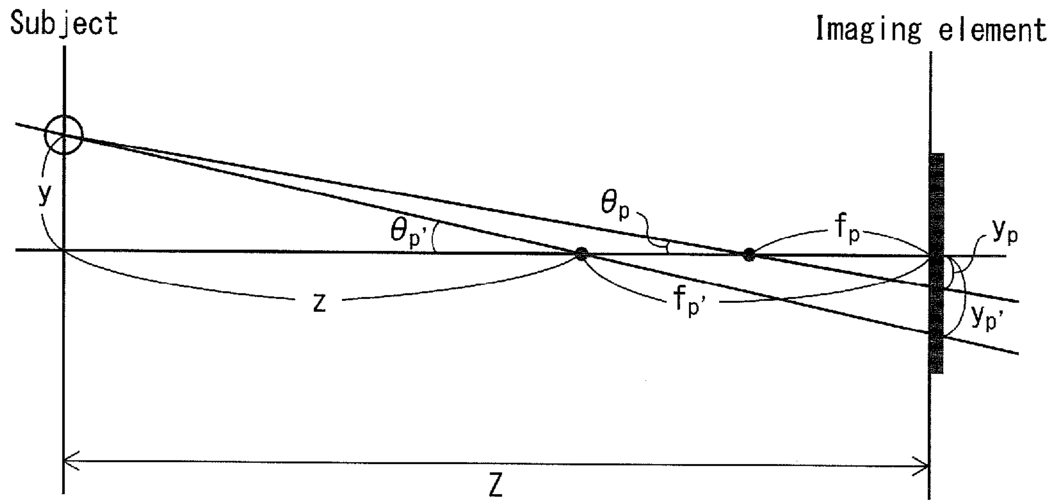
FIG. 16 shows the positional relation among a subject, a focus, and an imaging element relating to Embodiment 4 of the present invention.

FIG. 15 is a block diagram showing an image coding device 710 relating to Embodiment 4 of the present invention. Components shown in FIG. 15 that are the same as the components shown in FIG. 13 have the same numeral references, and description thereof is omitted.

The image coding device 710 relating to the present embodiment is characterized in acquiring distance information between an imaging element and a subject by a camera 120 performing zoom control to switch between two focal distances.

A stereoscopic video coding system shown in FIG. 15 acquires two images each having a different focal distance, calculates distance information of a subject based on disparity information indicating disparity between the two images, generates stereoscopic video signals with use of one of the two images based on the calculated distance information, and codes the generated stereoscopic video signals. This stereoscopic video coding system includes the image coding device 710 relating to Embodiment 4, the camera 120 capable of varying the focal distance by a zoom function, a blur parameter input unit 300, and a storage unit 400.

<Image Coding Device 710>

The image coding device 710 includes a disparity acquisition unit 703 that includes a distance detection subunit 704 that is connected to the camera 120 and the blur parameter input unit 300.

<Blur Parameter Input Unit 300>

The blur parameter input unit 300 receives input of a focal distance $f_p$ for image generation and a focal distance $f_{p'}$ for distance measurement (where, $f_p > f_p$).

The blur parameter input unit 300 outputs respective focal distance information pieces composed of the received two focal distances to the distance detection subunit 704.

<Distance Detection Subunit 704>

The distance detection subunit 704 receives the focal distances $f_p$ and $f_{p'}$ from the blur parameter input unit 300, alternately sets the received focal distances $f_p$ and $f_{p'}$ to the camera 120 frame by frame, and measures a distance for each pixel between the camera 120 and a subject included in an image output by the camera 120. The distance detection subunit 704 performs distance detection in accordance with the principle of the triangular measurement, by detecting disparity information of corresponding pixels in two types of images each having a different focal distance. The distance detection subunit 704 outputs information indicating the detected distance to the stereoscopic image generation subunit 702 and the blur processing unit 202.

Description is given with reference to FIG. 15. When the focal distance is $f_p$, the relation between a distance $y_p$ from the optical axis to a pixel on the imaging element corresponding to a subject and an angle $\theta_p$ relative to the optical axis is calculated as follows.

$$\tan\theta_p = \frac{y_p}{f_p} \quad \text{[Equation 6]}$$

Similarly, when the focal distance is $f_{p'}$, the relation between a distance $y_{p'}$ from the optical axis to a pixel on the imaging element corresponding to the subject and an angle $\theta_{p'}$ relative to the optical axis is calculated as follows.

$$\tan\theta_{p'} = \frac{y_{p'}}{f_{p'}} \quad \text{[Equation 7]}$$

Also, when a distance from the optical axis to the subject is y, a focal distance is $f_{p'}$, and a distance from the focus point to the subject is z, the relation among the angle $\theta_p$, the distance y, and the distance z is calculated as follows.

$$\tan\theta_p = \frac{y}{(f_{p'} - f_p) + z} \quad \text{[Equation 8]}$$

Similarly, the relation among the angle $\theta_{p'}$, the distance y, and the distance z is calculated as follows.

$$\tan\theta_{p'} = \frac{y}{z} \quad \text{[Equation 9]}$$

With use of Equations 6 to 9, a distance Z between the imaging element and the subject is calculated as follows.

$$Z = f_{p'} + z = \frac{f_p \cdot f_{p'} \cdot (y_{p'} - y_p)}{f_p \cdot y_{p'} - f_{p'} \cdot y_p} \quad \text{[Equation 10]}$$

The distance detection subunit 704 detects pixel points $y_p$ and $y_{p'}$ for each subject, and calculates the above distance Z between the imaging element and the subject with use of the detected pixel points $y_p$ and $y_{p'}$ by Equation 10. Note that detection of the pixel points $y_p$ and $y_{p'}$ may be performed in the same manner as in disparity detection performed by the disparity detection subunit 201 relating to Embodiment 1 in accordance with the block matching method, for example.

The distance detection subunit 704 outputs the distance Z between the imaging element and the subject to the stereoscopic image generation subunit 702.

<Stereoscopic Image Generation Subunit 702>

The stereoscopic image generation subunit 702 generates stereoscopic video signals containing a left-view image and a right-view image, based on the image output by the camera 120 and the distance information output by the disparity acquisition unit 703. Operations of this stereoscopic image generation subunit 702 are the same as those relating to Embodiment 3, and accordingly description thereof is omitted.

<Operations>

After completing the settings of the blur parameter, the image coding device 710 sets the focal distance of the camera 120 to $f_p$ to acquire image signals (Step S20). Then, the image coding device 710 acquires image signals having a focal distance of the camera 120 that is set to $f_{p'}$, and detects a disparity between images contained in the two acquired image signals to detect distance information for each subject based on a disparity value (Step S410).

As described above, the image coding device 710 relating to the present embodiment acquires one image and another image resulting from changing a focal distance of the one image, detects distance information of a subject included in each of the acquired images. With use of the distance information of the subject of each of the images, the image coding device 710 generates two stereoscopically-viewable images, adds arbitrary blur to the images, and codes the blurred images. This enables generation of coded stereoscopic video signals to which blur has been added, based on two single-viewpoint images each having a different focal distance, with use of a single camera capable of varying the focal distance by a zoom function.

Embodiment 5

The present embodiment describes a system including the image coding device relating to the present invention.

Figure 17:
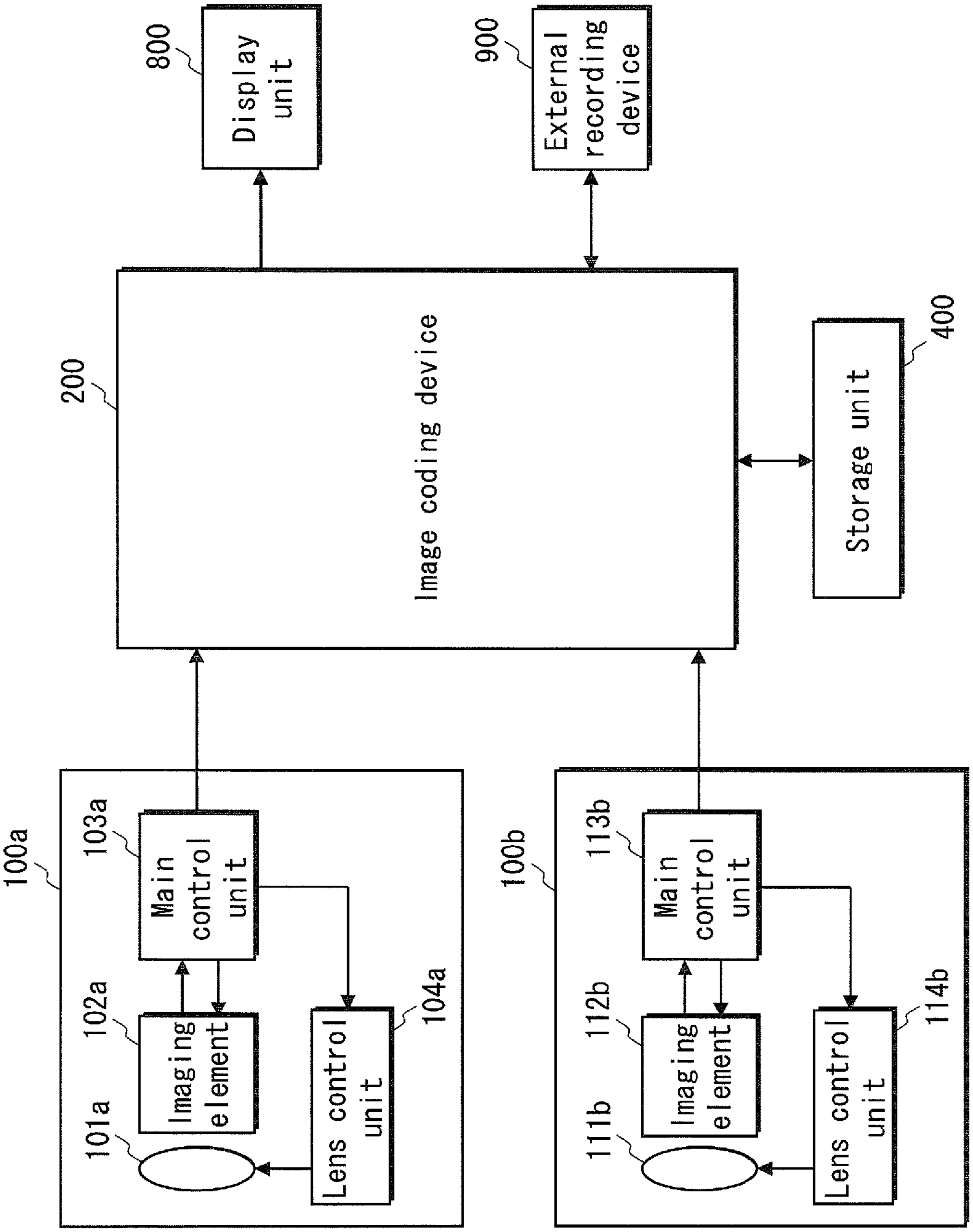
FIG. 17 is a block diagram showing an image coding system relating to Embodiment 5 of the present invention.

FIG. 17 is a block diagram showing the structure of an image coding system relating to the present embodiment. Components shown in FIG. 17 that are the same as the components shown in FIG. 1 have the same numeral references, and description thereof is omitted.

The image coding system includes an image coding device 200, a storage unit 400, a camera 100*a*, a camera 100*b*, a display unit 800, and an external recording device 900.

The camera 100*a* includes a lens 101*a*, an imaging element 102*a*, a main control unit 103*a*, and a lens control unit 104*a*. The imaging element 102*a* is, for example, a CCD (Charge Coupled Device) image sensor. The imaging element 102*a* acquires optical signals via the lens 101*a*, transforms the optical signals into electrical signals, and outputs the electrical signals to the main control unit 103*a*. The lens control unit 104*a* adjusts the focus of the lens 101*a* and so on under the control of the main control unit 103*a*. The main control unit 103*a* is, for example, an IC (Integrated Circuit). The main control unit 103*a* acquires the electrical signals output by the imaging element 102*a*, and outputs the acquired electrical signals to the image coding device 200 as video signals. Furthermore, the main control unit 103*a* controls the imaging element 102*a* and the lens control unit 103*a* to adjust the shutter speed, the gain, the focus, and so on.

The camera 100*b* includes a lens 101*b*, an imaging element 102*b*, a main control unit 103*b*, and a lens control unit 104*b*. These components of the camera 100*b* are the same as the components of the camera 100*a*.

The main control units 103*a* and 103*b* operate in cooperation with each other such that respective focuses, shutter speeds, and so on of the cameras 100*a* and 100*b* are coincident with each other.

The display unit 800 includes, for example, a liquid crystal display and so on. The display unit 800 acquires stereoscopic video signals from the image coding device 200, and displays a main image and a sub image contained in the acquired stereoscopic video signals.

The external recording device 900 is structured so as to have attached thereto a recording medium such as a BD-R (Blu-ray Disc Recordable). The external recording device 900 acquires the coding video signals from the image coding device 200, and writes the acquired coding video signals into the recording medium attached thereto.

Other Modification Examples of Embodiments (1) Embodiment 1 has described, as the disparity detection method by the block matching method, the case where a region having 16×16 pixels is extracted from a comparison source image and regions each having 16×16 pixels are extracted from a comparison target image, the SAD in brightness is calculated to search for an extraction point. Alternatively, regions to be extracted each may have, for example, 8×8 pixels or may have pixels of different horizontal and vertical sizes such as a region having 8×16 pixels. Further alternatively, instead of the SAD in brightness, the SSD (Sum of Squared Difference) in brightness or the ZNCC (Zero-mean Normalized Cross-Correlation) may be used, for example.

Yet alternatively, instead of the block matching method, a graph cut method may be used for calculating respective points in a main image and a sub image in correspondence with each other.

(2) Embodiment 1 has described, as the disparity detection method by the block matching method, the case where the difference in brightness is used. Alternatively, in the case where pixel values are represented in an RGB space, the difference in G value may be used, for example. Alternatively, in the case where pixel values are represented in an YCbCr space and the brightness Y value in an image is substantially uniform, the difference in Cb value or the difference in Cr value may be used, for example.

Further alternatively, for example, in the case where pixel values are represented in an RGB space, the SAD may be calculated with respect to each of R, G, and B values, and the minimum value, the average value, or the weighted average value of the calculated SAD values may be used. For example, in the case where a value resulting from dividing ((SAD of R)+(SAD of 2×G)+(SAD of B)) by four is determined to a disparity index, an extraction point where the disparity index is the minimum may be searched for. Similarly, in the case where pixel values are represented in a YCbCr space, the SAD is calculated with respect to each of Y, Cb, and Cr values, and the minimum value, the average value, or the weighted average value of the calculated SAD values may be used. This enables performance of disparity detection by an arbitrary method with use of all or part of pixel values.

(3) Embodiment 1 has described the case where the blur parameter input unit 300 receives a set parameter via the touch panel and the arrow keys, and designates a focus point to a point of a subject included in a main image. Alternatively, the blur parameter input unit 300 may be, for example, an arbitrary input device such as a keyboard and a dial. Further alternatively, in the case where the camera 100*a* has an auto-focus function, the blur parameter input unit 300 may acquire a focus point and focus point information P from the camera 100*a*, for example.

(4) Embodiment 1 has described, as the blur parameter, the focus point information P of a subject, the base-line length l between the cameras 100*a* and 100*b*, the focal distance $f_p$, the pixel size m, the virtual focal distance $f_v$, and the aperture value (F-number), in addition to the respective weighting coefficients $W_n$ and $W_f$ forward and backward the subject and the respective adjustment values of blur $S_f$ and $S_n$ forward and backward the subject. Alternatively, the pixel size m may be acquired from the camera 100*a*, and the base-line length l may be stored in the image coding device 200 in advance, for example. This enables acquisition and use of a blur parameter that is necessary and sufficient for blur addition.

Further alternatively, the image coding device 200 may store therein in advance a plurality of patterns relating to the correspondence between the distance from the focus point and the diameter of a circle of confusion, present a user with an image on which blur processing has been performed with use of any one of the patterns, and prompt the user to select one among the patterns the user hopes to use. This enables selection and addition of blur preferable for each user.

(5) Embodiment 1 has described the case where, as the blur parameter, the focal distance $f_p$ of the optical system used for photographing and the virtual focal distance $f_v$ are used, and the distance D between the camera and a subject is calculated with use of the focal distance $f_p$. Alternatively, in the case where the focus point P is calculated not based on the actual distance L but based on the disparity value d, a virtual focal distance $f_v$ may be used for calculating the distance D, in substitution for the focal distance $f_p$ of the optical system used for photographing, for example.

In the case where virtual focal distance $f_v$ is used for calculating the distance D between the camera and the subject based on the disparity value d in substitution for focal distance $f_p$, a distance D' (hereinafter, "virtual distance") calculated based on the disparity value d is $f_v/f_p$ times the actual distance D, and accordingly, the distances X and L are each $f_v/f_p$ times the actual value. Accordingly, in each of Equations 2 and 3 for calculating the diameter σ' of the virtual circle of confusion corresponding to the disparity value d, the first term on the righ-hand side is $f_v/f_p$ times the actual value. In view of this, by multiplying each of the weighting coefficients $W_n$ and $W_f$ by $f_v/f_p$ in advance, it is possible to calculate a desired diameter σ of a virtual circle of confusion corresponding to the disparity value d. Also, a virtual distance L' between the camera and the focus point P is $f_v/f_p$ times the actual distance L, and accordingly a virtual distance from the camera to each of all subjects and the focus point P is $f_v/f_p$ times the actual distance. Accordingly, there is no difference between the actual distance and the virtual distance in depth relation between each subject and the focus point and in depth relation between the subjects.

In other words, there is no influence by use of the focal distance $f_v$ in substitution for the focal distance $f_p$, except that a virtual distance between the camera and each point is $f_v/f_p$ times the actual distance and distance-dependent components of the diameter σ' of the virtual circle of confusion is $f_v/f_p$ times the actual distance-dependent components. Furthermore, as described above, $f_v/f_p$ times the weighting coefficients $W_n$ and $W_f$ cancel the influence on the diameter σ'. This eliminates any influence due to the use of the focal distance $f_v$ in substitution for the focal distance $f_p$ in calculation of blur matrix and blur value.

For the reasons as described above, the focal distance $f_v$ may be used in substitution for the focal distance $f_p$. This eliminates the need of the use of $f_p$, thereby reducing the number of blur parameters by one.

(6) Embodiment 1 has described the case where if a virtual circle of confusion is distant than a focus point, the diameter σ of the virtual circle of confusion is calculated by Equation 2, and if the virtual circle of confusion is closer than the focus point, the diameter σ of the virtual circle of confusion is calculated by Equation 3. Alternatively, the diameter σ of the virtual circle of confusion may be calculated as follows, with use of a diameter of circle of confusion of a virtual optical system with no modification.

$$\sigma = \frac{f_v^2 \cdot |X - L|}{F(L - f_v)X} \quad \text{[Equation 11]}$$

Further alternatively, only addition of adjustment value of blur or weighting coefficient may be performed with no approximation.

Figure 2C:
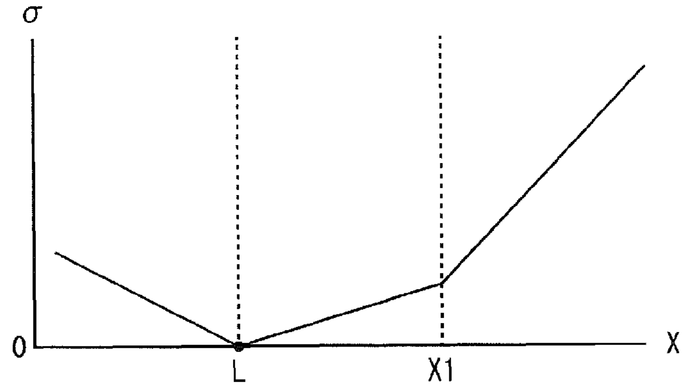

Yet alternatively, with respect to a distance range of each subject, a different equation for calculating the diameter σ may be used. For example, as shown in FIG. 2C, if a virtual circle of confusion is distant than the focus point, an equation for calculating the diameter σ in the case where the virtual circle of confusion is longer than an arbitrary distance X1 may be different from an equation for calculating the diameter σ in the case where the virtual circle of confusion is shorter than the arbitrary distance X1.

Figure 2D:
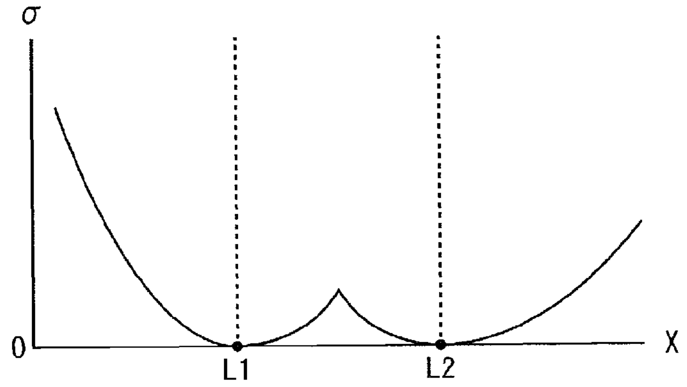

Further alternatively, the diameter σ may be calculated with use of an arbitrary function having X as a variable, instead of adding blur on the assumption of an ideal optical system. For example, as shown in FIG. 2D, two focus points L1 and L2 (where, L1<L2) may be used. A different equation for calculating the diameter σ may be used for each of the case where a virtual circle of confusion is closer than the focus point L1, the case where the virtual circle of confusion is distant than the focus point L2, and the case where the virtual circle of confusion is distant than the focus point L1 and is closer than the focus point L2. This enables performance of processing of focusing a plurality of subjects each having a different distance from the camera, and adding blur to all subjects that are not positioned in any focus point among the plurality of subjects.

Alternatively, the diameter σ may be calculated with use of the gain G of the camera sensor as follows, where the weighting coefficient is represented as $W_g$ and the adjustment of blur is represented as $S_g$.

$$\sigma = W_g \cdot G \cdot |X - L| + S_g \quad \text{[Equation 12]}$$

Alternatively, the diameter σ may be calculated with use of the ISO speed of the camera sensor as follows, where the weighting coefficient is represented as $W_{iso}$ and the adjustment of blur is represented as $S_{iso}$.

$$\sigma = W_{iso} \cdot \log_2 \frac{ISO}{100} \cdot |X - L| + S_{iso} \quad \text{[Equation 13]}$$

These enables enhancement of the focus point with no blur addition, and also enables addition of blur to points distant from the focus point in order to smooth a noise resulting from a high gain or a high ISO speed to make the distant points obscure.

In this way, it is possible to add arbitrary blur.

(7) Embodiment 1 has described, as the blur matrix, the matrix having filter coefficients that are each one and filter coefficients are each zero in the inside and the outside of the virtual circle of confusion having the diameter σ, respectively, as shown in FIG. 3A. Alternatively, the blur matrix may be an arbitrary matrix, such as a matrix having a filter coefficient that increases toward the center such as shown in FIG. 3B and a matrix having filter coefficients that are each one and filter coefficients that are each zero in the inside and the outside of a square having a diagonal line equal to the diameter σ of the virtual circle of confusion. Further alternatively, a matrix may be generated based on the calculated diameter σ of the virtual circle of confusion, with use of the Gaussian filter where $\sigma_g = \sigma/4$ is satisfied, as follows.

$$G(x, y) = \frac{1}{2\pi\sigma_g} \exp\left(-\frac{x^2 + y^2}{2\sigma_g^2}\right) \quad \text{[Equation 14]}$$

These above matrices may be freely input by a user or may be selected by the user from among matrices prepared in advance in the image coding device 200. This enables selection and addition of blur preferable for each user.

(8) Embodiment 1 has described the case where the blur value is represented by the diameter σ of a virtual circle of confusion. Alternatively, in the case where a blur matrix such as shown in FIG. 3B is used, the blur value may be the diameter of a range where a certain percentage of filter coefficients (68.26% here) is concentrated, for example.

Further alternatively, similarly, in the case where the blur matrix such as shown in FIG. 3B is used, under the conditions that the threshold value is determined to the average value of the filter coefficients, the blur value may be the diameter of a range where values higher than the threshold value are concentrated may be used, for example. Note that the threshold value may be the median value of the filter coefficients or half the maximum value of the filter coefficients.

Yet alternatively, in the case where the matrix with use of the Gaussian filter, which is calculated by Equation 14 in the above modification example (7), is used, the threshold value may be determined to σ/2.

This enables calculation of a blur value depending on the characteristics of each matrix.

(9) Embodiment 1 has described the case where the pixel unit for blur processing is composed of one pixel. Alternatively, the pixel unit may be, for example, composed of four pixels, namely, 2×2 pixels. This enables performance of blur processing in preferable units of pixels and reduction in processing amount.

(10) Embodiments 1 and 2 have described the case where, when the threshold values are determined to four pixels and eight pixels, the block size determination units 210*a* and 210*b* and the block size determination unit 610 output block size information indicating any of the two types of block sizes of 16×16 and 4×4 and block size information indicating any of the two types of block sizes of 16×16 and 8×8, respectively.

Alternatively, the number of pixels as the threshold value may be twice the diameter H/1300 of a permissible circle of confusion, where the diameter of the permissible circle of confusion is H/N (N is a value of 1000 to 1500) when the length of the diagonal line of an imaging surface that is the camera sensor is H.

Further alternatively, the number of pixels as the threshold value may be an arbitrary value that is lower than twice the maximum value $f^2/(FL)$ of the diameter of a circle of confusion on which none of approximation, addition of adjustment value of blur and addition of weighting coefficient has been performed and also is equal to or greater than twice the above diameter H/1300 of the permissible circle of confusion. This enables determination of the number of pixels as the threshold value depending on the size of the camera sensor to output block size information.

Yet alternatively, the number of pixels used as the threshold value may be arbitrarily set by a user.

(11) Embodiment 1 has described the case where, when the threshold value is determined to four pixels, the block size determination unit 210*a* outputs block size information indicating any of the two types of block sizes of 16×16 and 4×4. Alternatively, for example, in the case where the block size of 8×8 is available in addition to the block sizes of 16×16 and 4×4, the block size determination unit 210*a* may output block size information indicating any of three types of block sizes of 16×16, 8×8, and 4×4 under the conditions that the threshold value is determined to four pixels and eight pixels. This enables a region included in an image having a higher blur value to have a larger block size.

Further alternatively, in the case where the blur value is equal to or lower than the threshold value, the block size determination unit 210*a* may output block size information indicating the limitation to the smallest block size such as 4×4. This eliminates the need to perform intra prediction on a region having a low blur value with use of a plurality of block sizes, thereby reducing the processing amount.

(12) Embodiment 1 has described the case where, when the threshold value is determined to eight pixels, the block size determination unit 210*b* outputs block size information indicating the two types of block sizes of 16×16 and 8×8.

Alternatively, for example, in the case where a block that is to be determined to have the block size of 8×8 has a blur value of 4 pixels or low, the block size determination unit 210*b* may determine this block to sub blocks each having the block size of 4×4, under the conditions that the threshold value is determined to four pixels. This enables variation of the block size based on the blur value in a multi-stage manner.

Further alternatively, in the case where the blur value is equal to or lower than the threshold value, the block size determination unit 210*b* may output block size information indicating the limitation to the smallest block size such as 8×8. This eliminates the need to perform motion compensated prediction or disparity compensated prediction on a region having a low blur value with use of a plurality of block sizes, thereby reducing the processing amount.

Also, in accordance with the H.264 standard, the block sizes of 16×8 and 8×16 are also available. Accordingly, the following may be employed. For example, in the case where, under the conditions that the threshold value is determined to eight pixel, the block sizes of 8×8, 16×8, and 8×16 may be not used for a pixel unit having a blur value higher than eight pixels.

Alternatively, the following may be employed. In the case where, under the conditions that the threshold value is determined to eight pixels and six pixels, the block sizes of 8×8, 16×8, and 8×16 are not used for a pixel unit having a blur value higher than eight pixels, and the block size of 8×8 is not used for a pixel unit having a blur value higher than six pixels.

(13) Embodiment 1 has described the case where the detection unit 214 searches for a block that is the same as or similar to each block included in a region of 32×32 pixels surrounding a coding target block. Alternatively, the detection unit 214 may search for a block that is the same as or similar to each block included in a larger region such as a region of 64×64 pixels surrounding the coding target block. This enables searching for a more similar block.

Further alternatively, the detection unit 214 may search for a block that is the same as or similar to each block included in a smaller region of the coding target image. For example, the detection unit 214 may search for a block of 8×8 pixels included in a region of 16×16 pixels surrounding the coding target block. This enables reduction in processing amount.

(14) Embodiment 1 has described the case where since motion compensated prediction and disparity compensated prediction are each one type of inter prediction and are the same as or similar to each other in processing, the block size determination unit 210*b* and the block division unit 210*b* perform the both types of predictions, and the detection unit 214 and the compensation unit 215 perform the both types of predictions. Alternatively, the image coding device 200 may include a block size determination unit for motion compensated prediction and a block size determination unit for disparity compensated prediction, for example. This enables settings of a threshold value of blur value for block size determination so as to be different for each processing, thereby determining a block size preferable for each processing.

(15) Embodiment 1 has described the case where the detection unit 214 searches for a block that is the same as or similar to each of blocks of a coding target image to detect a disparity vector, with use of the block size indicated by block size information received by the block division unit 212*b*. Alternatively, the disparity vector may be calculated with use of disparity information detected by the disparity detection subunit 201. This enables skipping of block searching processing, thereby reducing the amount of processing.

(16) Embodiment 1 has described the case where the transform unit 216 performs DCT, and the inverse transform unit 220 performs IDCT. Alternatively, the transform unit 216 may perform DWT, and the inverse transform unit 220 may perform IDWT (Inverse Discrete Wavelet Transform), for example. This enables use of an arbitrary coding method by orthogonal transform.

(17) Embodiment 1 has described the case where the image coding device 200 performs coding in accordance with the H.264 MVC standard for both disparity compensated prediction and motion compensated prediction. Alternatively, a coding method with no use of disparity compensated prediction such as the H.264 standard and the MPEG-4 standard. This enables use of an arbitrary coding method as long as the block size is not limited to one type.

(18) Modification Example 1 of Embodiment 1 has described the case where, for each pixel of an image photographed by the camera 100, the distance acquisition unit 110 measures a distance between the camera 100 and a subject included in the image with use of ultrasonic waves, millimeter waves, or the like. Alternatively, the distance acquisition unit 110 may acquire the image output by the camera 100 and an image photographed at a viewpoint different from the viewpoint of the camera 100, and acquire the distance with use of disparity between the images, for example. Further alternatively, the distance acquisition unit 110 may be a distance measurement unit including a camera having two or more focal distances such as described in Embodiment 4, for example. This enables the disparity acquisition unit 501 to acquire disparity information or distance information which has been acquired by an arbitrary method, thereby enabling the image coding device 500 to perform blur processing and coding.

(19) Embodiment 2 has described the case where, when the threshold value is determined to eight pixels, the block size determination unit 610 outputs block size information indicating any of the two types of block sizes of 16×16 and 8×8. Alternatively, for example, the block size may be an arbitrary block size such as 4×4, 32×32, 8×16, and 64×32, and the threshold value may be arbitrary determined based on a block size to be used.

Further alternatively, for example, the block size determination unit 610 may output block size information indicating any of three types of block sizes of 16×16, 8×8, and 4×4 under the conditions that the threshold value is determined to four pixels and eight pixels. This enables a region included in an image having a higher blur value to have a larger block size.

(20) Embodiment 2 has described the example where, as the coding method, the JPEG 2000 standard for still images and the motion JPEG 2000 standard for video images are used. Alternatively, an arbitrary coding method may be used as long as a plurality of block sizes are available and orthogonal transform is performed.

(21) Embodiment 3 has described that the image coding device 700 includes the camera 100, the disparity acquisition unit 501, and the image acquisition unit 701, which are replaced from the cameras 100*a* and 100*b*, the disparity acquisition unit 207, and the image acquisition unit 206 of the image coding device 200, respectively. Alternatively, the image coding device relating to Embodiment 3 may include, for example, the camera 100, the disparity acquisition unit 501, and the image acquisition unit 701, which are replaced from the cameras 100*a* and 100*b*, the disparity acquisition unit 207, and the image acquisition unit 206 of the image coding device 600, respectively. This enables coding on stereoscopic video signals generated based on one image and distance information of a subject included in the image, with use of orthogonal transform of transforming into frequency components.

Similarly, the image coding device 710 relating to Embodiment 4 may include, for example, the camera 120, the disparity acquisition unit 703, and the image acquisition unit 701, which are replaced from the cameras 100*a* and 100*b*, the disparity acquisition unit 207, and the image acquisition unit 206 of the image coding device 600, respectively.

(22) Embodiment 4 has described the case where the focal distance $f_{p'}$ for distance detection is longer than the focal distance $f_p$ for image generation, namely, the case where $f_{p'}>f_p$ is satisfied. Alternatively, the focal distance $f_{p'}$ for distance detection may be shorter than the focal distance $f_p$ for image generation, namely, the case where $f_{p'}<f_p$ may be satisfied. This enables distance detection based on two images each having a different focal distance as long as it is possible to set the focal distance $f_{p'}$ so as to differ from the focal distance $f_p$ for image generation.

(23) Embodiment 5 has described the case where the image coding system includes the image coding device 200. Alternatively, the image coding system may include, for example, the image coding device 600, instead of the image coding device 200. Further alternatively, the image coding system may include, for example, the image coding device 500 or the image coding device 700 that is connected with the camera 100 and the distance acquisition unit 110, instead of the image coding device 200 that is connected with the cameras 100*a* and 100*b*. Yet alternatively, the image coding system may include, for example, the image coding device 710 that is connected with the cameras 120, instead of the image coding device 200 that is connected with the cameras 100*a* and 100*b*.

(24) Embodiment 5 has described the case where the display unit 800 acquires stereoscopic video signals from the image coding device 200, and displays a main image and a sub image contained in the acquired stereoscopic video signals. Alternatively, the display unit 800 may acquire locally-decoded image signals from the image coding device 200, and display a main image and a sub image contained in the acquired locally-decoded image signals, for example. This enables monitoring of coded image signals.

(25) Embodiment 5 has described the case where the external storage device 900 has attached thereto a BD-R as a recording medium. Alternatively, as the recording medium, the following media may be employed for example, including a CD-R (Compact Disc Recordable), an MO (Magnet Optical disk), a DVD-R (Digital Versatile Disk Recordable), and a semiconductor memory such as an SDHC memory card and an SDXC memory card.

Figure 18:
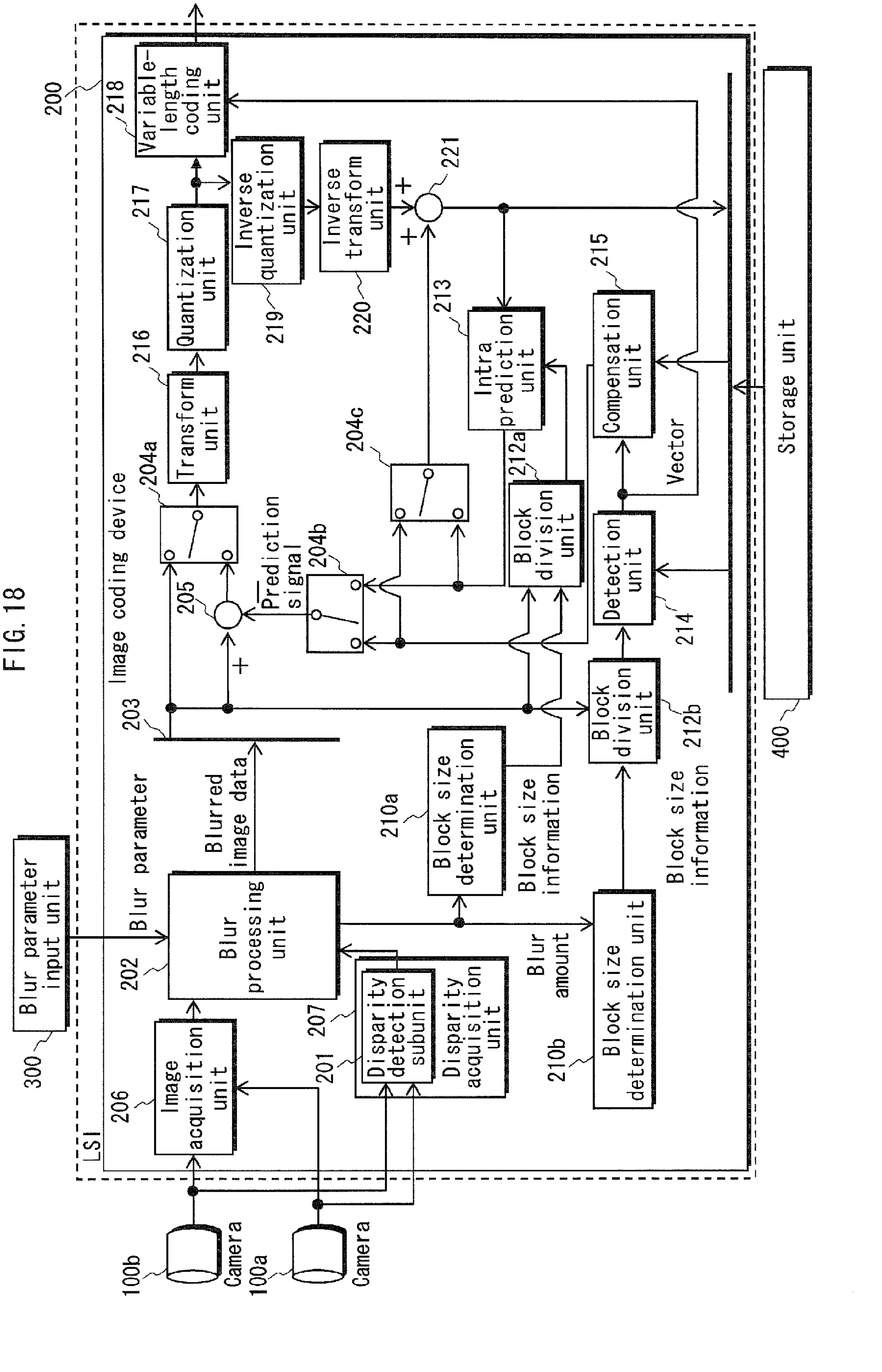
FIG. 18 is a block diagram showing, as an integrated circuit, the image coding device relating to Embodiment 1 of the present invention.

(26) The respective image coding devices relating to the above embodiments each may be typically embodied as an LSI (Large Scale Integration) that is an integrated circuit. Also, each of the circuits of the image coding devices may be separately integrated into a single chip, or integrated into a single chip including part or all of the circuits. For example, the blur processing unit 202 may be integrated into a chip together with other circuits such as shown in FIG. 18, or may be separately integrated into a chip.

Furthermore, the LSI may be called an IC, a system LSI, a super LSI, and an ultra LSI, depending on the integration degree.

In addition, the method for assembling integrated circuits is not limited to LSI, and a dedicated circuit or a general-purpose processor may be used. Furthermore, it may be possible to use an FPGA (Field Programmable Gate Array) programmable after manufacturing LSIs or a reconfigurable processor in which connection and setting of a circuit cell inside an LSI is reconfigurable after manufacturing LSIs.

Furthermore, if technology for forming integrated circuits that replaces LSIs emerges, owing to advances in semiconductor technology or to another derivative technology, the integration of functional blocks may naturally be accomplished using such technology.

(27) The above embodiments and modification examples are each just an example of the present invention, and various improvements and modifications may be made without departing from the scope of the present invention.

The following describes the structures and effects of the image coding device relating to the above embodiments, an integrated circuit thereof, and an image coding method.

(a) The image coding device relating to the embodiments comprises: an image acquisition unit configured to acquire one or more images; a disparity acquisition unit configured to acquire, with respect to each of the acquired images, one of disparity information for each pixel unit and distance information for each pixel unit; a blur value determination unit configured to determine a blur value of the image for each pixel unit based on the acquired one of the disparity information and the distance information; a blur processing unit configured to perform blur processing on the image with use of the determined blur value; a block size determination unit configured to determine, with respect to the image on which the blur processing has been performed, a block size of each of regions of the image that are to be divided into blocks for coding, from among a plurality of block sizes based on a blur value of the region; and a coding unit configured to code the image in units of blocks in accordance with the determined block sizes.

Also, the integrated circuit relating to the embodiments comprises: an image acquisition unit configured to acquire one or more images; a disparity acquisition unit configured to acquire, with respect to each of the acquired images, one of disparity information for each pixel unit and distance information for each pixel unit; a blur value determination unit configured to determine a blur value of the image for each pixel unit based on the acquired one of the disparity information and the distance information; a blur processing unit configured to perform blur processing on the image with use of the determined blur value; a block size determination unit configured to determine, with respect to the image on which the blur processing has been performed, a block size of each of regions of the image that are to be divided into blocks for coding, from among a plurality of block sizes based on a blur value of the region; and a coding unit configured to code the image in units of blocks in accordance with the determined block sizes.

Also, the image coding method relating to the embodiments comprises: an image acquisition step of acquiring one or more images; a disparity acquisition step of acquiring, with respect to each of the acquired images, one of disparity information for each pixel unit and distance information for each pixel unit; a blur value determination step of determining a blur value of the image for each pixel unit based on the acquired one of the disparity information and the distance information; a blur processing step of performing blur processing on the image with use of the determined blur value; a block size determination step of determining, with respect to the image on which the blur processing has been performed, a block size of each of regions of the image that are to be divided into blocks for coding, from among a plurality of block sizes based on a blur value of the region; and a coding step of coding the image in units of blocks in accordance with the determined block sizes.

Also, the image coding system relating to the embodiments includes a camera for photographing an image, an image coding device for coding the photographed image to generate compressed image data, and a recording medium for recording therein the compressed image data, the image coding device comprising: an image acquisition unit configured to acquire one or more images; a disparity acquisition unit configured to acquire, with respect to each of the acquired images, one of disparity information for each pixel unit and distance information for each pixel unit; a blur value determination unit configured to determine a blur value of the image for each pixel unit based on the acquired one of the disparity information and the distance information; a blur processing unit configured to perform blur processing on the image with use of the determined blur value; a block size determination unit configured to determine, with respect to the image on which the blur processing has been performed, a block size of each of regions of the image that are to be divided into blocks for coding, from among a plurality of block sizes based on a blur value of the region; and a coding unit configured to code the image in units of blocks in accordance with the determined block sizes.

With these structures, the block size for coding the image is determined based on the blur value. This enables use of an appropriate block size based on the blur value for each pixel unit of the image.

(b) According to the image coding device relating to the embodiments described in the above section (a), the blur value determination unit may determine the blur value based on a blur parameter of the image, in addition to based on the acquired one of the disparity information and the distance information.

This structure enables performance of various types of blur processing with use of arbitrary blur information such as focus point information and a blur amount based on distance information of each subject, in addition to the disparity information.

(c) According to the image cording device relating to the embodiments described in the above section (b), the blur parameter may include an optical characteristic value that differs from a characteristic value of an optical system by which the image has been photographed.

This structure enables setting of a virtual optical system with use of blur information and generation of an image to which blur has been added at an arbitrary degree without limiting to the optical system by which the image has been actually photographed. Alternatively, this above structure enables, by blur processing, generation of an image that is assumed to have been photographed by an optical system that is difficult to be realized.

(d) According to the image coding device relating to the embodiments described in the above section (c), the blur parameter may include focus point information of at least one subject included in the image.

This structure enables performance of blur processing with use of focus point information. Accordingly, it is possible to perform blur processing that cannot be realized by an actual optical system, such as blur processing according to which there exists a plurality of focus points.

(e) According to the image coding device relating to the embodiments described in the above section (a), with respect to a pixel unit having a blur value higher than a threshold value, the block size determination unit may determine a block size other than the smallest block size among the plurality of block sizes.

With this structure, according to the coding method with use of two or more types of block sizes, a block size to be used is limited to a larger block size with respect to a region having a higher blur value. Accordingly, it is possible to improve the compression rate of a region having a small information amount caused by a high blur amount. Also, intra prediction coding is performed with no need of selecting a prediction block size with respect to a block size smaller than the determined block size, and this further reduces the processing amount.

(f) According to the image coding device relating to the embodiments described in the above section (a), with respect to a pixel unit having a blur value equal to or lower than a threshold value, the block size determination unit may determine at least the smallest block size among the plurality of block sizes.

With this structure, variable blocks including a small block are available for a region having a low blur value or a region to which no blur is added, and this prevents loss in information amount. Also, by determining a plurality of block sizes to be available for intra prediction coding, it is possible to efficiently perform prediction coding processing with use of a large block size in the case where a reference block is limited to the large block size.

(g) According to the image coding device relating to the embodiments described in the above section (e) or (f), the coding unit may perform one of motion compensated prediction, disparity compensated prediction, and intra prediction on the image, by searching for a block similar to each of the blocks of the image with use of the determined block size for each of the blocks, selecting a block size of the most similar block resulting from the searching, and generating a prediction residual signal of each of the blocks with use of the selected block size.

With the above structure, in order to perform processing of one of motion compensated prediction, disparity compensated prediction, and intra prediction, it is possible to select a block size preferable for the processing among the determined variable block sizes, thereby minimizing a prediction residual signal and achieving high compression.

(h) According to the image coding device relating to the embodiments described in the above section (a), the image acquisition unit may acquire a left-view image and a right-view image for use in stereoscopic image display, and the disparity acquisition unit may include a disparity detection subunit configured to detect disparity between a region of the left-view image and a region of the right-view image in correspondence with each other.

With the above structure, disparity information is generated for each pixel unit with use of a left-view image and a right-view image for use in stereoscopic image display. Accordingly, on a stereoscopic image composed of the left-view image and the right-view image, blur processing is performed with use of the generated disparity information and coding is performed with use of an appropriate block size.

(j) According to the image coding device relating to the embodiments described in the above section (a), the image acquisition unit may include a stereoscopic image generation subunit configured to generate a stereoscopic image composed of a left-view image and a right-view image based on an acquired image, one of disparity information and distance information with respect to the acquired image.

With the above structure, two images for stereoscopic image display are generated based on one image and distance information of a subject included in the image. Accordingly, on a generated stereoscopic image, blur processing is performed with use of the distance information of the subject and coding is performed with use of an appropriate block size.

INDUSTRIAL APPLICABILITY

The present invention relates to an image coding device for coding image signals, especially enables addition of appropriate blur based on distance information of a subject and determination of a block size based on a blur value, and is effective for efficient coding and reduction in processing amount.

The present invention is, therefore, useful for image recording devices such as digital video cameras and digital still cameras, and is also useful for image transmission devices, image editing devices, and so on.

REFERENCE SIGNS LIST

100, 100*a*, 100*b*, and 120 camera
101*a* and 101*b* lens
102*a* and 102*b* imaging element
103*a* and 103*b* main control unit
110 distance acquisition unit
200, 500, 600, 700, and 710 image coding device
201 disparity detection subunit
202 blur processing unit
203 selector
204*a*, 204*b*, and 204*c* switch
205 subtractor
206 and 701 image acquisition unit
207, 501, and 703 disparity acquisition unit
210*a*, 210*b*, and 610 block size determination unit

212*a*, 212*b*, and 611 block division unit
213 intra prediction unit
214 detection unit
215 compensation unit
216 transform unit
217 quantization unit
218 variable-length coding unit
219 inverse quantization unit
220 inverse transform unit
221 adder
300 blur parameter input unit
400 storage unit
702 stereoscopic image generation subunit
704 distance detection subunit
800 display unit
900 external storage device

The invention claimed is:

1. An image coding device comprising:

an image acquisition unit configured to acquire one or more images;

a disparity acquisition unit configured to acquire, with respect to each of the acquired images, one of disparity information for each pixel unit and distance information for each pixel unit;

a blur value determination unit configured to determine a blur value of the image for each pixel unit based on the acquired one of the disparity information and the distance information;

a blur processing unit configured to perform blur processing on the image with use of the determined blur value;

a block size determination unit configured to determine, with respect to the image on which the blur processing has been performed, a block size of each of regions of the image that are to be divided into blocks for coding, from among a plurality of block sizes based on a blur value of the region; and a coding unit configured to code the image in units of blocks in accordance with the determined block sizes.

2. The image coding device of claim 1, wherein the blur value determination unit determines the blur value based on a blur parameter of the image, in addition to based on the acquired one of the disparity information and the distance information.

3. The image coding device of claim 2, wherein the blur parameter includes an optical characteristic value that differs from a characteristic value of an optical system by which the image has been photographed.

4. The image coding device of claim 3, wherein the blur parameter includes focus point information of at least one subject included in the image.

5. The image coding device of claim 1, wherein with respect to a pixel unit having a blur value higher than a threshold value, the block size determination unit determines a block size other than the smallest block size among the plurality of block sizes.

6. The image coding device of claim 5, wherein the coding unit performs one of motion compensated prediction, disparity compensated prediction, and intra prediction on the image, by searching for a block similar to each of the blocks of the image with use of the determined block size for each of the blocks, selecting a block size of the most similar block resulting from the searching, and generating a prediction residual signal of each of the blocks with use of the selected block size.

7. The image coding device of claim 1, wherein with respect to a pixel unit having a blur value lower than a threshold value, the block size determination unit determines at least the smallest block size among the plurality of block sizes.

8. The image coding device of claim 6, wherein the coding unit performs one of motion compensated prediction, disparity compensated prediction, and intra prediction on the image, by searching for a block similar to each of the blocks of the image with use of the determined block size for each of the blocks, selecting a block size of the most similar block resulting from the searching, and generating a prediction residual signal of each of the blocks with use of the selected block size.

9. The image coding device of claim 1, wherein the image acquisition unit acquires a left-view image and a right-view image for use in stereoscopic image display, and the disparity acquisition unit includes a disparity detection subunit configured to detect disparity between a region of the left-view image and a region of the right-view image in correspondence with each other.

10. The image coding device of claim 1, wherein the image acquisition unit includes a stereoscopic image generation subunit configured to generate a stereoscopic image composed of a left-view image and a right-view image based on an acquired image, one of disparity information and distance information with respect to the acquired image.

11. An integrated circuit comprising:

an image acquisition unit configured to acquire one or more images;

a disparity acquisition unit configured to acquire, with respect to each of the acquired images, one of disparity information for each pixel unit and distance information for each pixel unit;

a blur value determination unit configured to determine a blur value of the image for each pixel unit based on the acquired one of the disparity information and the distance information;

a blur processing unit configured to perform blur processing on the image with use of the determined blur value;

a block size determination unit configured to determine, with respect to the image on which the blur processing has been performed, a block size of each of regions of the image that are to be divided into blocks for coding, from among a plurality of block sizes based on a blur value of the region; and a coding unit configured to code the image in units of blocks in accordance with the determined block sizes.

12. An image coding method comprising:

an image acquisition step of acquiring one or more images;

a disparity acquisition step of acquiring, with respect to each of the acquired images, one of disparity information for each pixel unit and distance information for each pixel unit;

a blur value determination step of determining a blur value of the image for each pixel unit based on the acquired one of the disparity information and the distance information;

a blur processing step of performing blur processing on the image with use of the determined blur value;

a block size determination step of determining, with respect to the image on which the blur processing has been performed, a block size of each of regions of the image that are to be divided into blocks for coding, from among a plurality of block sizes based on a blur value of the region; and a coding step of coding the image in units of blocks in accordance with the determined block sizes.

13. An image coding system that includes a camera for photographing an image, an image coding device for coding the photographed image to generate compressed image data, and a non-transitory recording medium for recording therein the compressed image data, the image coding device comprising:

an image acquisition unit configured to acquire one or more images;

a disparity acquisition unit configured to acquire, with respect to each of the acquired images, one of disparity information for each pixel unit and distance information for each pixel unit;

a blur value determination unit configured to determine a blur value of the image for each pixel unit based on the acquired one of the disparity information and the distance information;

a blur processing unit configured to perform blur processing on the image with use of the determined blur value;

a block size determination unit configured to determine, with respect to the image on which the blur processing has been performed, a block size of each of regions of the image that are to be divided into blocks for coding, from among a plurality of block sizes based on a blur value of the region; and a coding unit configured to code the image in units of blocks in accordance with the determined block sizes.

* * * * *